US011716729B2

(12) United States Patent
Xiong et al.

(10) Patent No.: US 11,716,729 B2
(45) Date of Patent: Aug. 1, 2023

(54) RESOURCE MAPPING AND MULTIPLEXING OF UPLINK CONTROL CHANNEL AND UPLINK DATA CHANNEL

(71) Applicant: Apple Inc., Cupertino, CA (US)

(72) Inventors: Gang Xiong, Portland, OR (US); Joonyoung Cho, Portland, OR (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 16/476,040

(22) PCT Filed: Feb. 6, 2018

(86) PCT No.: PCT/US2018/017114
§ 371 (c)(1),
(2) Date: Jul. 3, 2019

(87) PCT Pub. No.: WO2018/145115
PCT Pub. Date: Aug. 9, 2018

(65) Prior Publication Data
US 2019/0335449 A1    Oct. 31, 2019

Related U.S. Application Data

(60) Provisional application No. 62/457,596, filed on Feb. 10, 2017, provisional application No. 62/455,443, filed on Feb. 6, 2017.

(51) Int. Cl.
*H04W 72/21* (2023.01)
*H04L 1/1607* (2023.01)
(Continued)

(52) U.S. Cl.
CPC ........... *H04W 72/21* (2023.01); *H04L 1/1671* (2013.01); *H04L 5/0037* (2013.01);
(Continued)

(58) Field of Classification Search
CPC ... H04L 1/1671; H04L 5/0051; H04L 5/0053; H04L 5/0044; H04L 5/0055; H04L 5/0037; H04W 72/0413; H04W 52/0216
See application file for complete search history.

(56) References Cited

U.S. PATENT DOCUMENTS

2017/0295589 A1* 10/2017 Sundararajan .......... H04L 25/08
2017/0325216 A1* 11/2017 Nogami ................ H04L 5/0055
(Continued)

OTHER PUBLICATIONS

3GPP TSG RAN WG1 AH_NR Meeting Spokane, USA, Jan. 16-20, 2017, R1-1700618, Source: NTT Docomo, Inc. Title: Summary of [87-32]: UL L 1/L2 control channel design for NR, Agenda Item: 5.1.3.2 (Year: 2017).*
(Continued)

*Primary Examiner* — Mehmood B. Khan
(74) *Attorney, Agent, or Firm* — Sterne, Kessler, Goldstein & Fox P.L.L.C.

(57) ABSTRACT

Described is an apparatus of a User Equipment (UE). The apparatus may comprise a first circuitry, a second circuitry, and a third circuitry. The first circuitry may be operable to process a Physical Downlink Control Channel (PDCCH) within a bandwidth at a start of a slot. The second circuitry may be operable to allocate a Guard Period (GP) within the bandwidth and subsequent to the PDCCH. The third circuitry may be operable to generate a Physical Uplink Control Channel (PUCCH) within the bandwidth and in one or more Orthogonal Frequency-Division Multiplexing (OFDM) symbols at the end of the slot. The third circuitry may also be operable to generate a Physical Uplink Shared Channel (PUSCH) within the bandwidth and in one or more OFDM symbols extending between the GP and the PUCCH, the PUSCH being time-division multiplexed with the PUCCH.

24 Claims, 19 Drawing Sheets

(51) Int. Cl.
*H04L 5/00* (2006.01)
*H04W 52/02* (2009.01)

(52) U.S. Cl.
CPC .......... *H04L 5/0051* (2013.01); *H04L 5/0055* (2013.01); *H04W 52/0216* (2013.01)

(56) References Cited

U.S. PATENT DOCUMENTS

| | | | | |
|---|---|---|---|---|
| 2018/0132229 A1* | 5/2018 | Li | .................... | H04W 72/0413 |
| 2018/0132264 A1* | 5/2018 | Jung | .................... | H04L 1/1854 |
| 2018/0249458 A1* | 8/2018 | He | .................... | H04W 72/12 |
| 2018/0270011 A1* | 9/2018 | Yang | .................... | H04L 1/0026 |
| 2019/0116611 A1* | 4/2019 | Lee | .................... | H04W 72/20 |
| 2019/0159138 A1* | 5/2019 | Lee | .................... | H04W 52/146 |
| 2019/0327759 A1* | 10/2019 | Lee | .................... | H04W 72/1268 |
| 2019/0335449 A1* | 10/2019 | Xiong | .................... | H04W 72/21 |
| 2019/0356524 A1* | 11/2019 | Yi | .................... | H04L 27/26025 |
| 2019/0372720 A1* | 12/2019 | Lee | .................... | H04L 1/1832 |
| 2021/0195586 A1* | 6/2021 | Kim | .................... | H04W 72/0406 |

OTHER PUBLICATIONS

International Preliminary Report on Patentability for PCT Application No. PCT/US18/17114, dated Aug. 15, 2019.
International Search Report and Written Opinion for PCT Application No. PCT/US18/17114, dated May 17, 2018.
Huawei, et al., "Discussion on new frame structure for latency reduction in TDD", 3GPP Draft; R1-160754, St. Julian's, Malta, Feb. 14, 2016.
NTT Docomo, et al., "Summary of [87-32]: UL L1/L2 control channel design for NR", 3GPP; R1-1700618, Spokane, WA, USA, Jan. 17, 2017.
ZTE, et al., "On Indicating HARQ timing and PUCCH resource", 3GPP; R1-1700872, Spokane, WA, USA, Jan. 16, 2017.

* cited by examiner

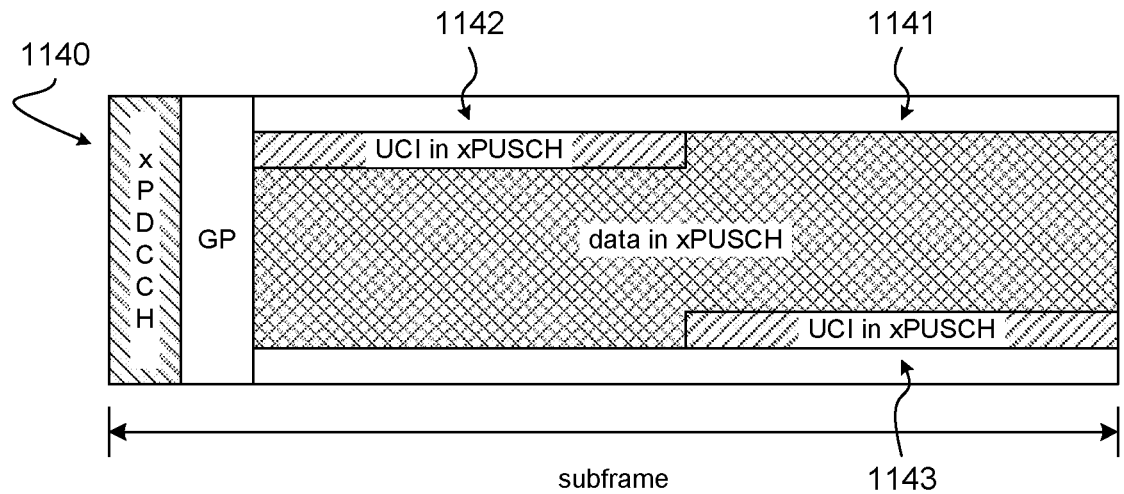
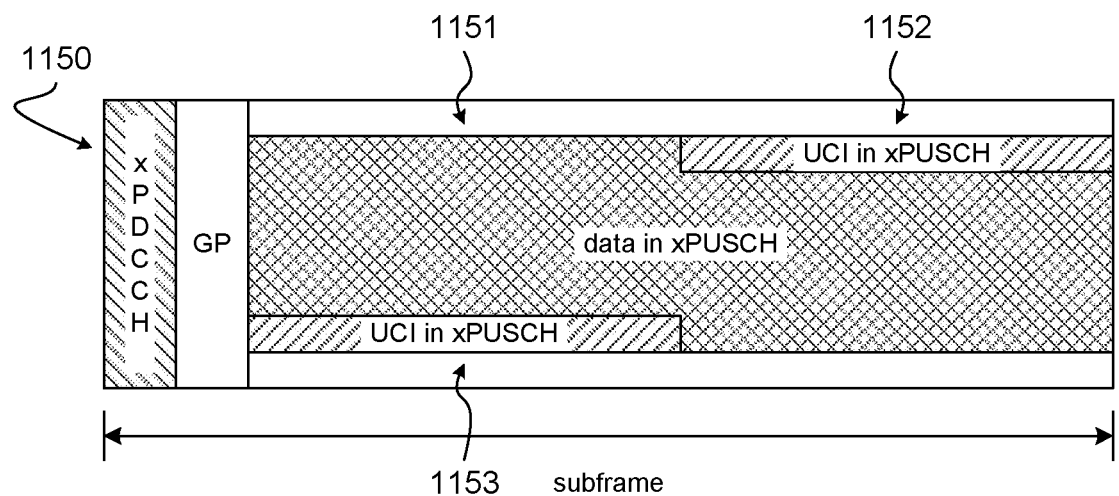
Fig. 11B

RESOURCE MAPPING AND MULTIPLEXING OF UPLINK CONTROL CHANNEL AND UPLINK DATA CHANNEL

CLAIM OF PRIORITY

The present application claims priority under 35 U.S.C. § 119(e) to U.S. Provisional Patent Application Ser. No. 62/455,443 filed Feb. 6, 2017, and to U.S. Provisional Patent Application Ser. No. 62/457,596 filed Feb. 10, 2017, which are herein incorporated by reference in their entirety.

BACKGROUND

A variety of wireless cellular communication systems have been implemented, including 3rd Generation Partnership Project (3GPP) Universal Mobile Telecommunications Systems, 3GPP Long-Term Evolution (LTE) systems, and 3GPP LTE-Advanced (LTE-A) systems. Next-generation wireless cellular communication systems based upon LTE systems and LTE-A systems are being developed, such as fifth generation (5G) wireless systems/5G mobile networks systems. Next-generation wireless cellular communication systems may provide support for massive numbers of user devices including Narrowband Internet-of-Things (NB-IoT) devices, Cellular Internet-of-Things (CIoT) devices, and Machine-Type Communication (MTC) devices. Such devices may have very low device complexity, may be latency-tolerant, and may be designed for low throughput and very low power consumption.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

FIGS. 11A-11B illustrate Frequency Division Multiplexing (FDM) of long UCI and data, in accordance with some embodiments of the disclosure.

DETAILED DESCRIPTION

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced systems, and 5th Generation (5G) wireless systems/5G mobile networks systems/5G New Radio (NR) systems.

Mobile communication has evolved significantly from early voice systems to contemporary highly-sophisticated integrated communication platforms. 5G wireless communication systems, or 5G NR systems, may provide access to information and sharing of data in a wide variety of places and at a wide variety of times, for a wide variety of users and applications. 5G systems may provide unified networks and/or systems targeted toward a variety of different and sometimes conflicting performance dimensions. Such diverse, multi-dimensional requirements are in turn driven by underlying differences in targeted services and applications. In general, NR systems may evolve from 3GPP LTE-Advanced systems, with additional potential new Radio Access Technologies (RATs). NR may enable a wide variety of applications based on wireless connections and may deliver fast, rich contents and services. The resulting systems may enrich lives with better, simpler, and seamless wireless connectivity solutions.

Figure 1:
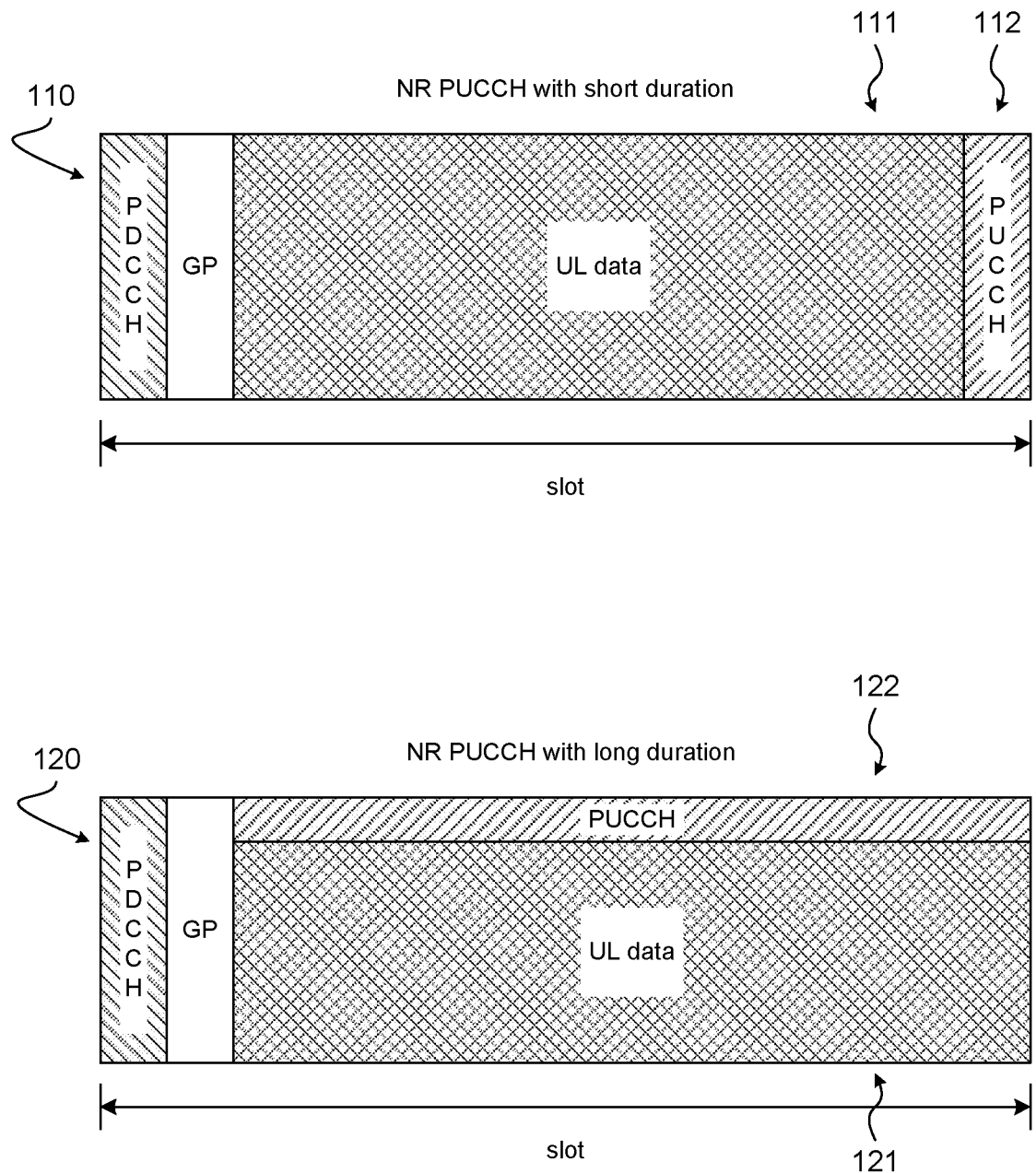
FIG. 1 illustrates scenarios of New Radio (NR) Physical Uplink Control Channel (PUCCH) with short duration and NR PUCCH with long duration in an Uplink (UL) data slot, in accordance with some embodiments of the disclosure.

FIG. 1 illustrates scenarios of NR Physical Uplink Control Channel (PUCCH) with short duration and NR PUCCH with long duration in an Uplink (UL) data slot, in accordance with some embodiments of the disclosure. A first structure 110, which may correspond with a scenario of PUCCH with short duration (short PUCCH), may span a slot (or a subframe) in time, and may comprise both UL and Downlink (DL) channels spanning substantially the same frequency resources. First structure 110 may accordingly extend over a plurality of OFDM symbols and may extend over a plurality of subcarrier frequencies.

First structure 110 may comprise a Physical Downlink Control Channel (PDCCH), followed by a Guard Period (GP), followed by a Physical Uplink Shared Channel (PUSCH) 111 (e.g., UL data) and a PUCCH 112, with PUSCH 111 and PUCCH 112 being multiplexed in a time-division multiplexing (TDM) manner.

A second structure 120, which may correspond with a scenario of PUCCH with long duration (long PUCCH), may span a slot (or a subframe) in time, and may comprise both UL and DL channels spanning substantially the same frequency resources. Second structure 120 may accordingly extend over a plurality of OFDM symbols and may extend over a plurality of subcarrier frequencies. Second structure 120 may comprise a PDCCH, followed by a GP, followed by a PUSCH 121 and a PUCCH 122, with PUSCH 121 and PUCCH 122 being multiplexed in a frequency-division multiplexing (FDM) manner.

FIG. 1 may illustrate some embodiments of NR with short durations and long durations within a UL data slot. For NR PUCCH with short durations, NR PUCCH and NR PUSCH may be multiplexed in a TDM manner, which may be targeted for low-latency applications. For NR PUCCH with long durations, multiple OFDM symbols may be allocated for NR PUCCH, which may improve link budget and/or UL coverage for control channel. More specifically, for UL data slots, NR PUCCH and/or NR PUSCH may be multiplexed in an FDM fashion. Note that a GP may be allocated for insertion between NR PDCCH and NR PUSCH in order to accommodate a DL-to-UL and/or UL-to-DL switching time and/or round-trip propagation delay.

Figure 2:
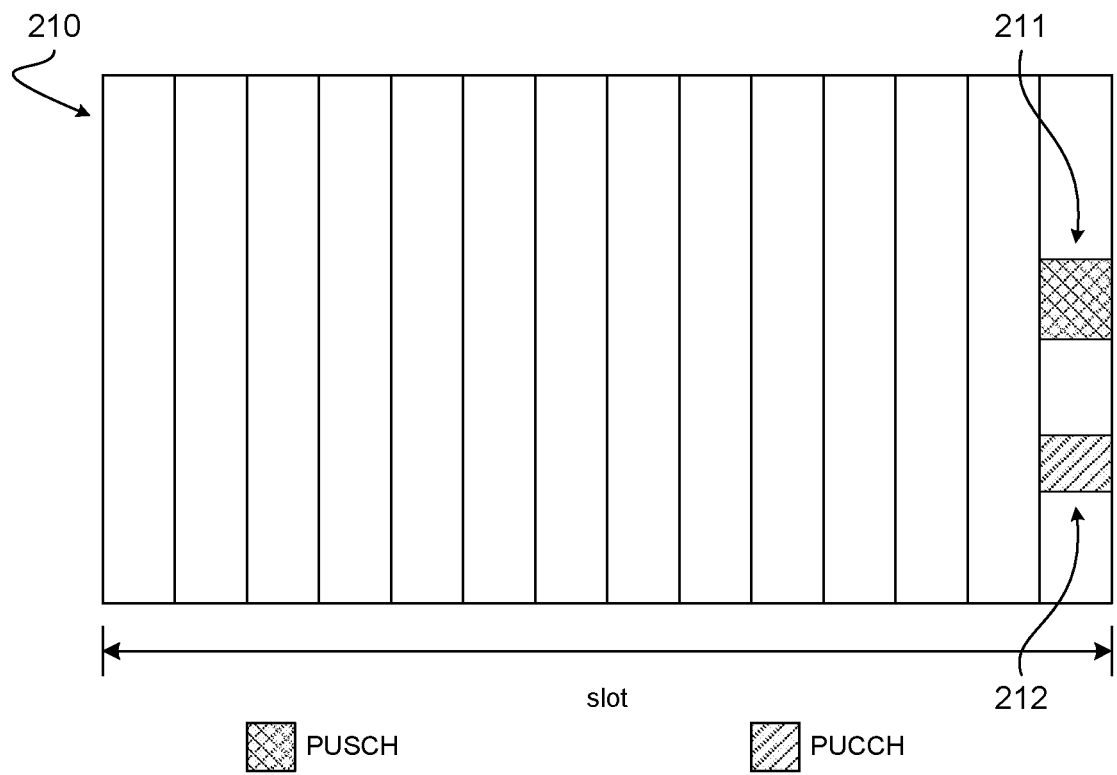
FIG. 2 illustrates a scenario of non-contiguous resources for short PUCCH and short Physical Uplink Shared Channel (PUSCH), in accordance with some embodiments of the disclosure.

FIG. 2 illustrates a scenario of non-contiguous resources for short PUCCH and short PUSCH, in accordance with some embodiments of the disclosure. A structure 210 may span a slot (or a subframe) in time, may extend over a plurality of OFDM symbols, and may extend over a plurality of subcarrier frequencies. At the end of the slot (e.g., in one or more OFDM symbols), structure 210 may comprise a PUSCH 211 and a PUCCH 212, each of which may span one or more subcarrier frequencies. In various embodiments, PUSCH 211 and PUCCH 212 may span non-contiguous sets of frequency resources.

In DL-centric slots, short Uplink Control Information (UCI) and/or short UL data may be multiplexing in an FDM manner by one UE if data is scheduled on a short UL portion (e.g., a short UL portion of a slot or subframe). Transmission of UL data and UL control channel may accordingly be distributed. In some embodiments, Inter-Modulation Distortion (IMD) may be expected, which may not be desirable for power-limited scenarios, since a UE may therefore be disposed to performing power backoff for UL transmission.

To alleviate potential IMD concerns, in cases of simultaneous transmission of short UL control and short UL data channel, an Evolved Node-B (eNB) and/or a 5G eNB (gNB) may indicate that a UE should transmit short UL control channel and/or short UL data channel in contiguous resources (e.g., contiguous frequency resources). Further, various multiplexing schemes may advantageously improve robustness of short UL control channel.

Discussed herein are various mechanisms and methods for multiplexing UL control channel and UL data channel. Some embodiments may provide for resource mapping for short PUCCH. Some embodiments may provide for multiplexing of short PUCCH and short data. Some embodiments may provide for simultaneous transmission of long PUCCH and data channel (e.g., for low-IMD scenarios).

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable eNB, a Narrowband Internet-of-Things (NB-IoT) capable eNB, a Cellular Internet-of-Things (CIoT) capable eNB, a Machine-Type Communication (MTC) capable eNB, and/or another base station for a wireless communication system. The term "gNB" may refer to a 5G-capable or NR-capable eNB. For purposes of the present disclosure, the term "UE" may refer to a legacy LTE capable User Equipment (UE), an NB-IoT capable UE, a CIoT capable UE, an MTC capable UE, and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

Various embodiments discussed herein may incorporate mechanisms and methods related to resource mapping for short PUCCH. For NR systems, UCI may include scheduling request (SR), Hybrid Automatic Repeat Request (HARQ) Acknowledgement (ACK)/Non-Acknowledgement (NACK) feedback, Channel State Information (CSI) reports (e.g., Channel Quality Indicator (CQI), Pre-coding Matrix Indicator (PMI), and/or Rank Indicator (RI)), and/or beam-related information. For short PUCCH, NR systems may support at least FDM-based multiplexing of Demodulation Reference Signal (DM-RS) and UCI symbols within one symbol duration.

Multiple NR PUCCH formats may be supported in order to accommodate various UCI types and payload sizes. Furthermore, simultaneous transmission of multiple UCI feedbacks in a single NR PUCCH in the same slot may be supported. In cases in which one symbol is used for NR PUCCH transmission, when multiple UCI feedbacks are scheduled in the same slot, it may be more desirable to combine the multiple UCI feedbacks and carry that information in a single NR PUCCH. This may be related to the expectation of high Peak-to-Average Power Ratio (PAPR)/Cubic Metric (CM) and potential IMD when multiple UCI feedbacks are transmitted in independent and/or non-contiguous NR PUCCH resources in one symbol.

According to this design principle, certain UCI feedbacks may be aggregated and transmitted simultaneously in a single NR PUCCH. For instance, in cases in which HARQ ACK/NACK feedback and/or periodic CSI reports are scheduled in the same slot, a UE may group HARQ ACK/NACK feedback and CSI reports and transmit them simultaneously on a single NR PUCCH. Moreover, since HARQ-ACK feedback may be an important class of information among UCI, greater protection may be advantageous when combining HARQ-ACK feedback with other UCI information for short PUCCH.

In some embodiments, independent encoding procedures may be defined for HARQ-ACK feedback and for other UCI information. Lower coding rates for HARQ-ACK feedback may be used in comparison with coding schemes for other UCI information (e.g., including CSI reports).

For some embodiments, after encoding and modulation, separate resource mapping may employed for different UCI information. In particular, modulated symbols for HARQ-ACK feedback may be mapped to REs which are adjacent to REs carrying DM-RS. Remaining REs may then be allocated for the transmission of other UCI information. In some embodiments, channel estimation performance for HARQ-ACK feedback may be improved, which may advantageously improve HARQ-ACK performance since HARQ-ACK feedback might not rely on retransmission. As a result, HARQ-ACK performance may accordingly be made advantageous more robust.

Figure 3:
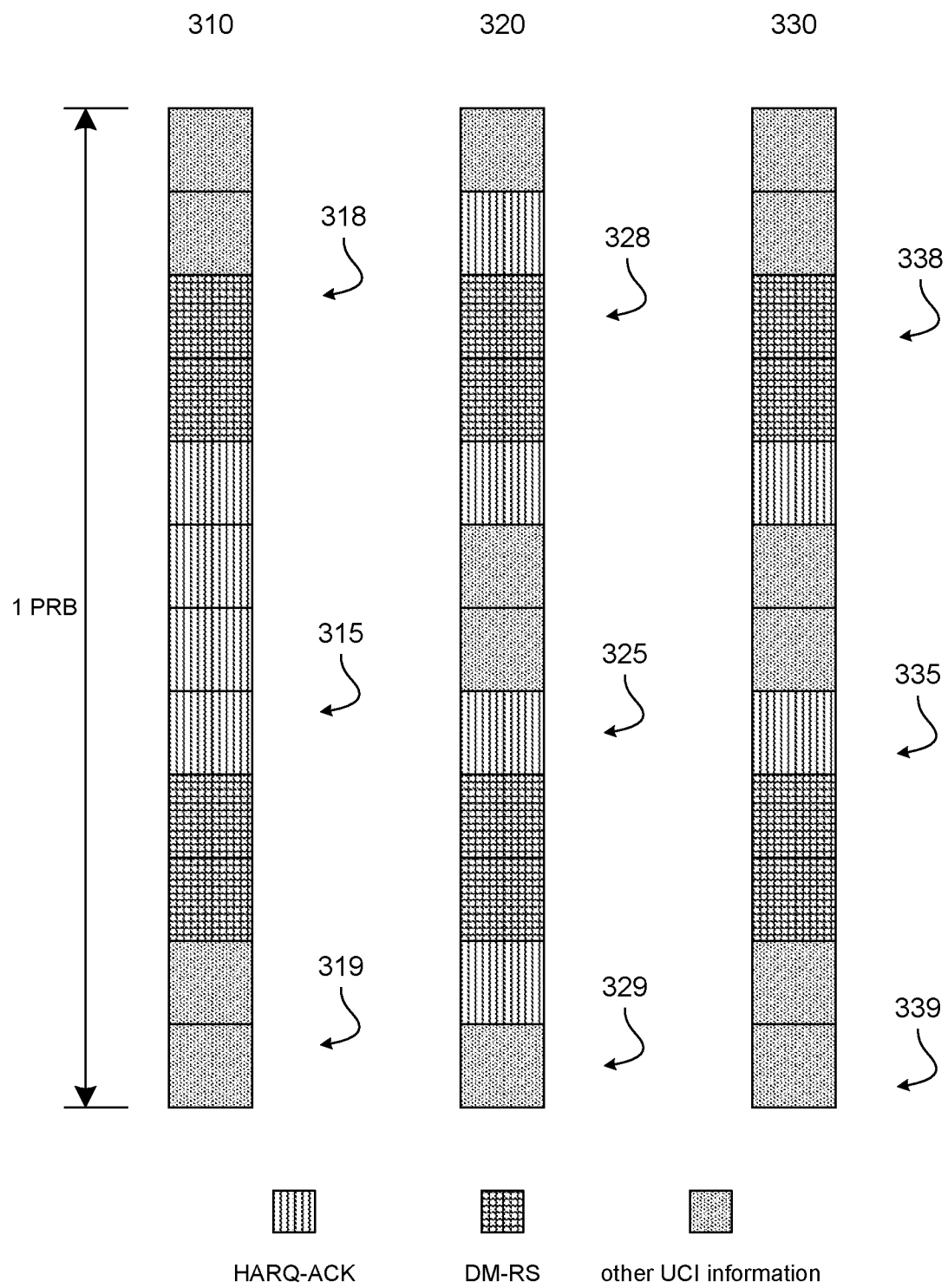
FIG. 3 illustrates scenarios of resource mapping for different types of Uplink Control Information (UCI) within one Physical Resource Block (PRB), in accordance with some embodiments of the disclosure.

FIG. 3 illustrates scenarios of resource mapping for different types of UCI within one PRB, in accordance with some embodiments of the disclosure. A first structure 310 may span one PRB in frequency, may extend over one or more OFDM symbols (e.g., at the end of a slot or subframe), and may extend over a plurality of subcarrier frequencies. In various embodiments, first structure 310 may carry various PUCCH REs. For example, first structure 310 may comprise one or more HARQ-ACK REs 315 (e.g., REs carrying HARQ-ACK), one or more DM-RS REs 318 (e.g., REs carrying DM-RS), and one or more other UCI REs 319 (e.g., REs carrying other UCI information).

In first structure 310, HARQ-ACK may be carried on frequency resources between frequency resources carrying DM-RS. Both HARQ-ACK and DM-RS may then be carried on frequency resources between frequency resources carrying other UCI information.

A second structure 320 may span one PRB in frequency, may extend over one or more OFDM symbols (e.g., at the end of a slot or subframe), and may extend over a plurality of subcarrier frequencies. In various embodiments, second structure 320 may carry various PUCCH REs. For example, second structure 320 may comprise one or more HARQ-ACK REs 325 (e.g., REs carrying HARQ-ACK), one or more DM-RS REs 328 (e.g., REs carrying DM-RS), and one or more other UCI REs 329 (e.g., REs carrying other UCI information).

In second structure 320, DM-RS may be carried on frequency resources between frequency resources carrying HARQ-ACK. Both DM-RS and HARQ-ACK may then be carried on frequency resources between frequency resources carrying other UCI information, and may also be carried on frequency resources separated by frequency resources carrying other UCI information.

A third structure 330 may span one PRB in frequency, may extend over one or more OFDM symbols (e.g., at the end of a slot or subframe), and may extend over a plurality of subcarrier frequencies. In various embodiments, third structure 330 may carry various PUCCH REs. For example, third structure 330 may comprise one or more HARQ-ACK REs 335 (e.g., REs carrying HARQ-ACK), one or more DM-RS REs 338 (e.g., REs carrying DM-RS), and one or more other UCI REs 339 (e.g., REs carrying other UCI information).

In third structure 330, DM-RS may be carried on frequency resources adjacent to frequency resources carrying HARQ-ACK. Both DM-RS and HARQ-ACK may then be carried on frequency resources between frequency resources carrying other UCI information, and may also be carried on frequency resources separated by frequency resources carrying other UCI information.

In embodiments in which short PUCCH carrying combined UCI information for HARQ-ACK, CSI report, and so forth occupies multiple PRBs, modulated symbols for HARQ-ACK may be transmitted in a distributed manner. For example, depending on the number of PRBs allocated for short PUCCH, a number L of blocks (where L may be, for example, 2 or 4) may be allocated in a distributed manner for the transmission of modulated symbols for HARQ-ACK. Furthermore, each block may contain a number M of REs, which may be allocated adjacent to DM-RS REs.

Figure 4:
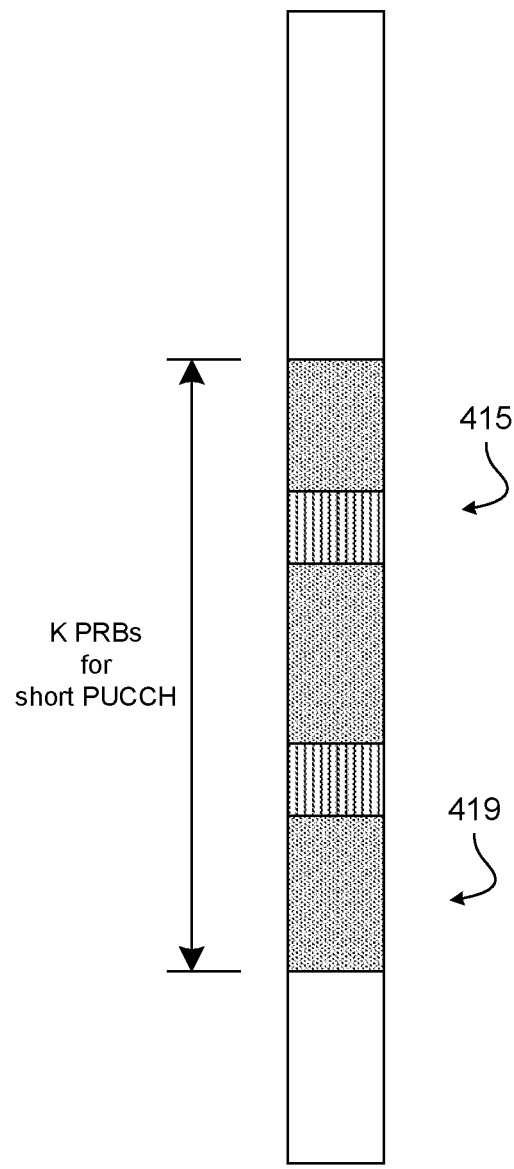
FIG. 4 illustrates a scenario of distributed transmission for Hybrid Automatic Repeat Request (HARQ) Acknowledgement (ACK) feedback, in accordance with some embodiments of the disclosure.

FIG. 4 illustrates a scenario of distributed transmission for HARQ-ACK feedback, in accordance with some embodiments of the disclosure. A structure 410 may span a number K of PRBs in frequency, may extend over one or more OFDM symbols (e.g., at the end of a slot or subframe), and may extend over a plurality of subcarrier frequencies. In various embodiments, structure 410 may carry various PUCCH REs. For example, structure 410 may comprise one or more HARQ-ACK REs 415 (e.g., REs carrying HARQ-ACK) and one or more other UCI REs 419 (e.g., REs carrying other UCI information).

For example, two blocks may be allocated in a distributed manner within K PRBs, which may be occupied by NR PUCCH. In some embodiments, the K PRBs may be logically-mapped PRBs (i.e., per a logical mapping), and may be distributed in frequency in physical resource mapping.

In some embodiments, NR systems may support short UL control channels with two-symbol duration within a slot, which may in turn help improve link budgets for short UL control channel. For some embodiments, for TDM based multiplexing of DM-RS and UCI symbols using doubled subcarrier spacing within one symbol duration, front-loaded DM-RS patterns may be considered.

Figure 5:
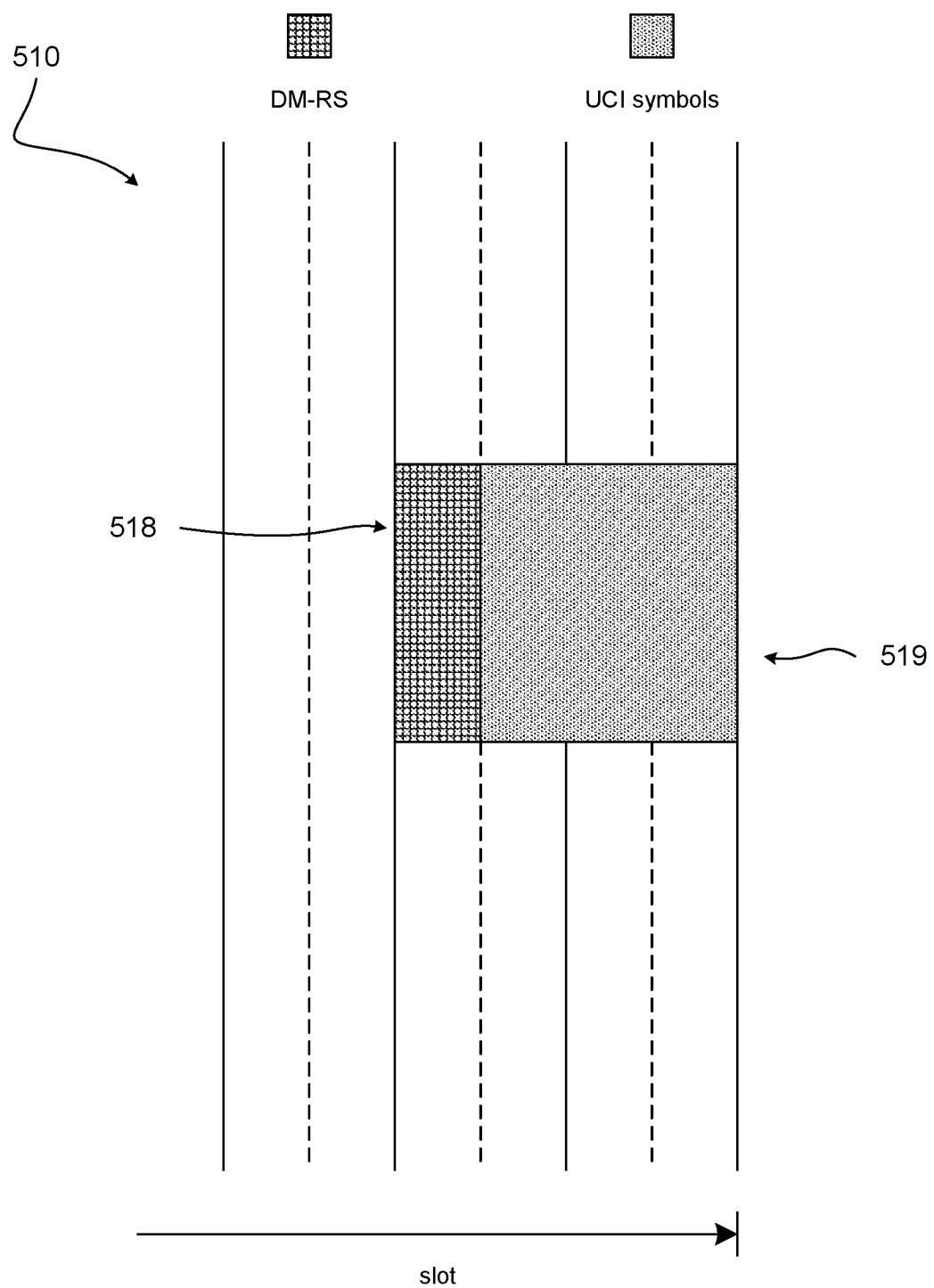
FIG. 5 illustrates a scenario of Demodulation Reference Signal (DM-RS) pattern for short PUCCH with two-symbol duration, in accordance with some embodiments of the disclosure.

FIG. 5 illustrates a scenario of DM-RS pattern for short PUCCH with two-symbol duration, in accordance with some embodiments of the disclosure. A structure 510 may span a portion of a slot or a subframe in time (e.g., an end portion of a slot or a subframe), may extend over a plurality of OFDM symbols, and may extend over a plurality of subcarrier frequencies. In various embodiments, structure 510 may carry various PUCCH REs.

For example, structure 510 may comprise one or more DM-RS REs 518, followed by one or more UCI symbol REs 519 (e.g., REs carrying other UCI information).

In some embodiments, DM-RS using doubled subcarrier spacing may be inserted at the beginning of a short PUCCH, which may advantageously facilitate early decoding of short PUCCH. For some embodiments, some UCI symbols may be inserted within the same symbol as DM-RS, which may advantageously further reduce DM-RS overhead.

For some embodiments, short PUCCH may span two symbols. In some embodiments, different UCI types may be transmitted in different symbols within a slot. For instance, CSI report and/or HARQ-ACK feedback may be transmitted in the second-to-last and last symbol within a slot, respectively. UE processing time for DL data demodulation and decoding may accordingly be relaxed by one or more symbol durations, which may be beneficial for low-latency applications.

In some embodiments, in cases of combined CSI report and HARQ-ACK feedback in a short PUCCH spanning two symbols, CSI report may be transmitted in the second-to-last symbol within a slot or mini-slot, and HARQ-ACK feedback may be transmitted in a last symbol within a slot or mini-slot. In some embodiments, different coding schemes and/or resource mapping may be applied for different UCI types. Furthermore, different numbers of PRBs may be allocated for transmission of CSI report and HARQ-ACK in different symbols. For some embodiments, having relatively small payload sizes of HARQ-ACK feedback (e.g., 1 or 2 bits of information), different DM-RS patterns and/or density may be used for the transmission of CSI report and HARQ-ACK.

Figure 6:
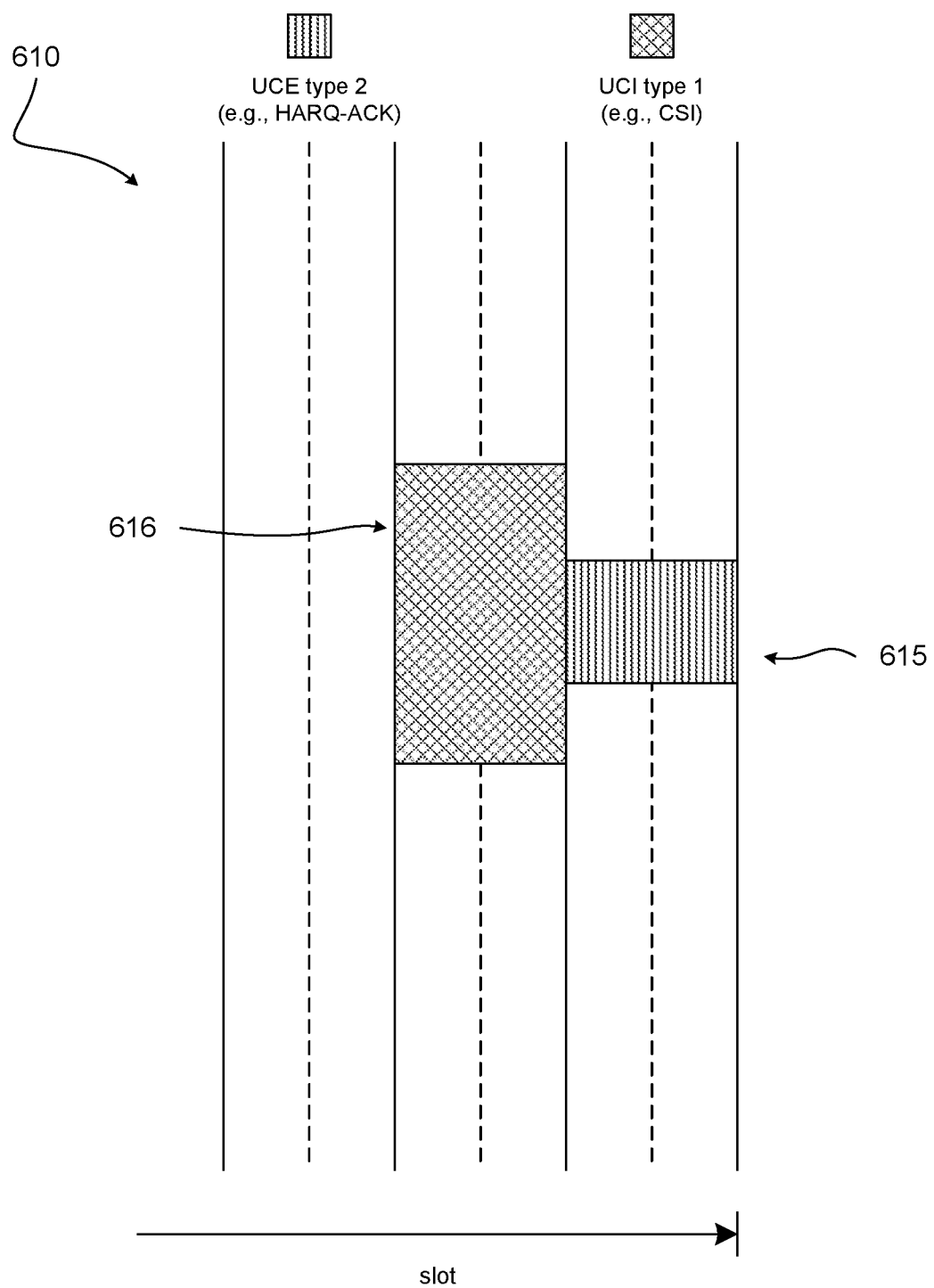
FIG. 6 illustrates a scenario of different transmission bandwidths for different UCI types in short PUCCH with two-symbol duration, in accordance with some embodiments of the disclosure.

FIG. 6 illustrates a scenario of different transmission bandwidths for different UCI types in short PUCCH with two-symbol duration, in accordance with some embodiments of the disclosure. A structure 610 may span a portion of a slot or a subframe in time (e.g., an end portion of a slot or a subframe), may extend over a plurality of OFDM symbols, and may extend over a plurality of subcarrier frequencies. In various embodiments, structure 610 may carry various PUCCH REs.

For example, structure 610 may comprise one or more UCI type 1 REs 616 (e.g., REs carrying CSI report) followed by one or more UCI type 2 REs 615 (e.g., REs carrying HARQ-ACK).

In some embodiments, in cases of combined CSI report and HARQ-ACK feedback in short PUCCH spanning two symbols, CSI report may be transmitted in the second-to-last symbol and last symbol within a slot or mini-slot, and HARQ-ACK feedback may be transmitted in the last symbol within a slot or mini-slot.

Figure 7A:
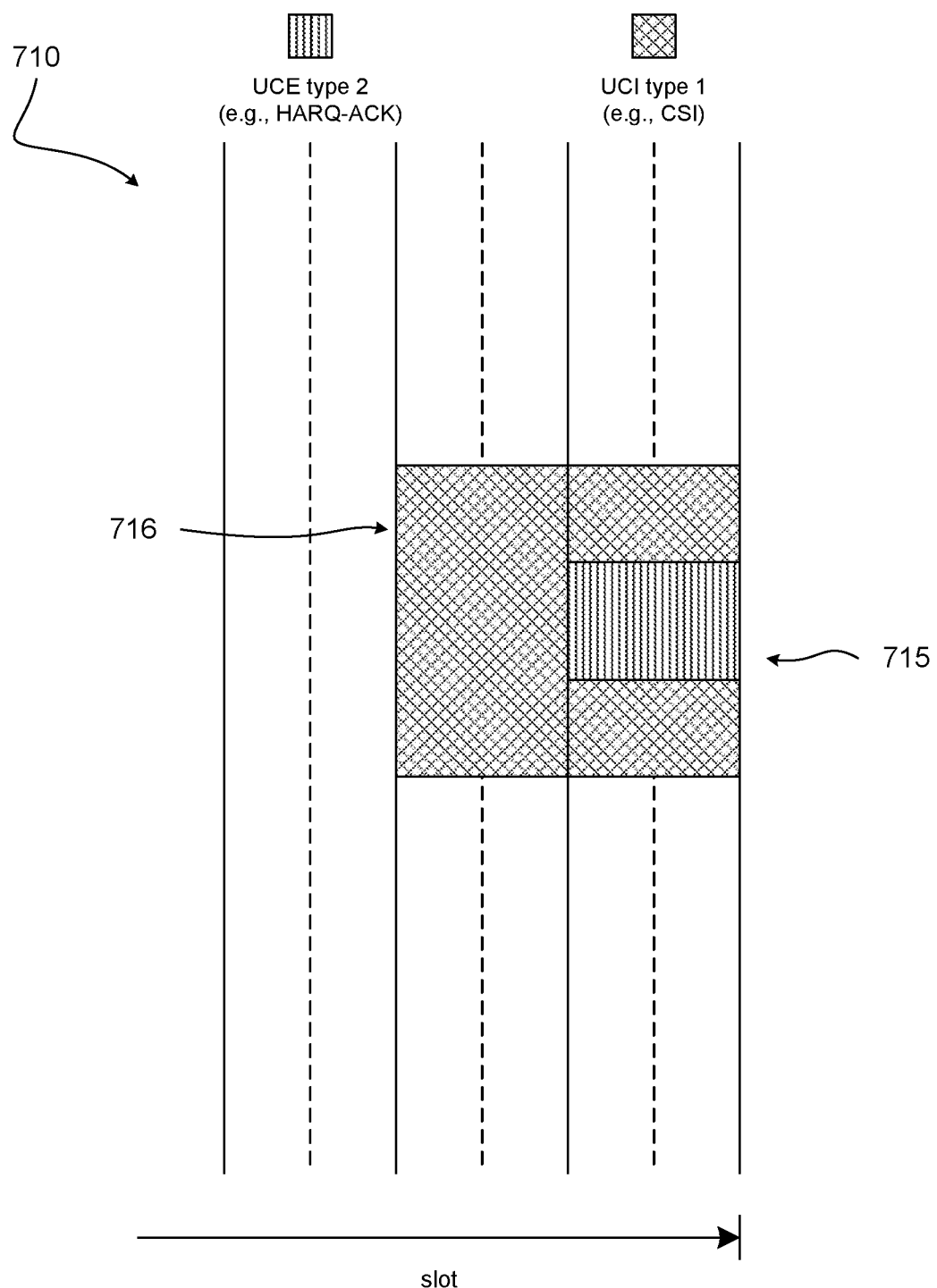
FIGS. 7A-7B illustrate scenarios of combined Channel State Information (CSI) report and HARQ-ACK feedback in the last symbol for short PUCCH with two-symbol durations, in accordance with some embodiments of the disclosure.
Figure 7B:
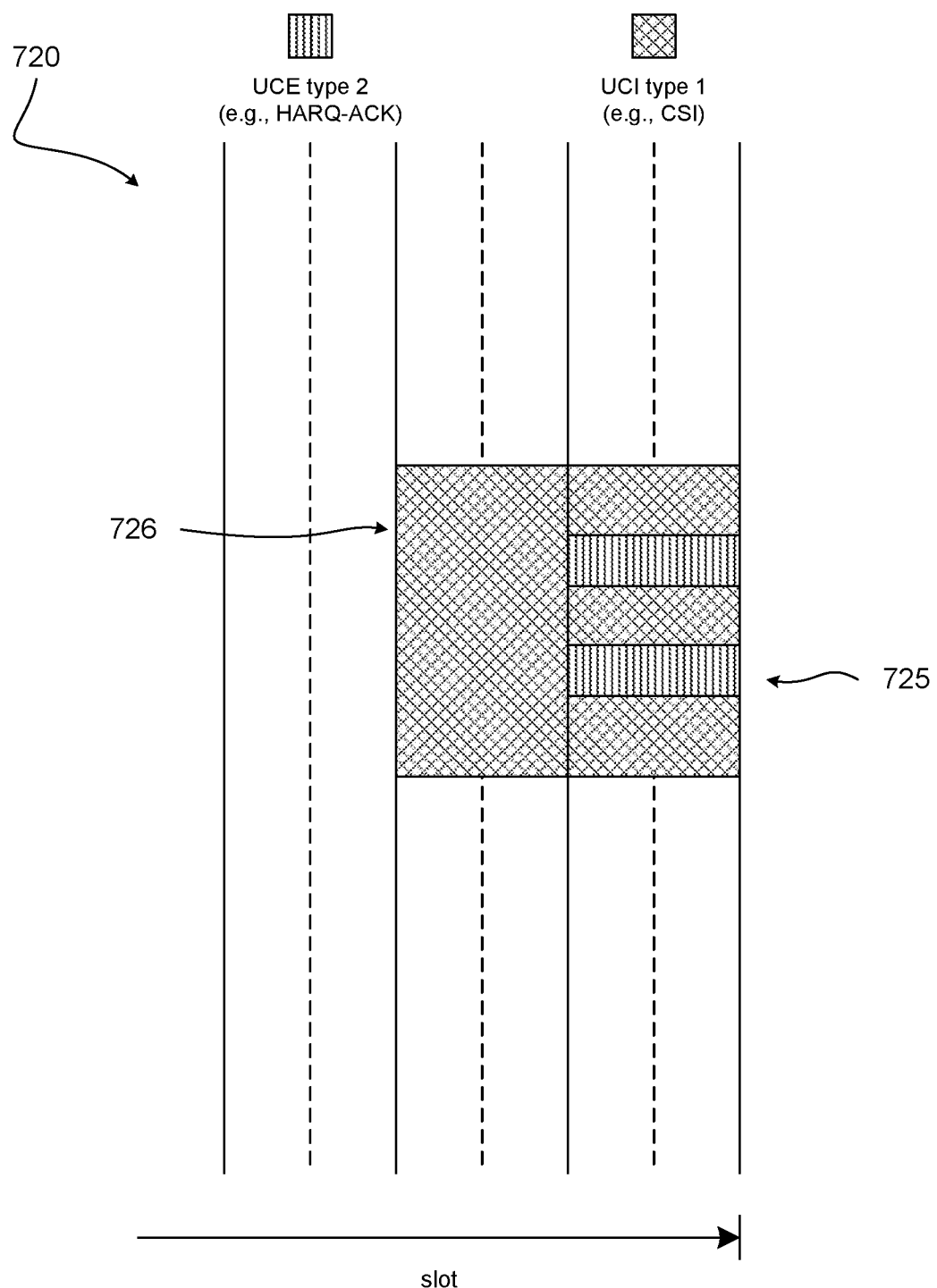

FIGS. 7A-7B illustrate scenarios of combined CSI report and HARQ-ACK feedback in the last symbol for short PUCCH with two-symbol durations, in accordance with some embodiments of the disclosure. A first structure 710 may span a portion of a slot or a subframe in time (e.g., an end portion of a slot or a subframe), may extend over a plurality of OFDM symbols, and may extend over a plurality of subcarrier frequencies. In various embodiments, first structure 710 may carry various PUCCH REs.

For example, first structure 710 may comprise one or more UCI type 2 REs 715 (e.g., REs carrying HARQ-ACK) and one or more UCI type 1 REs 716 (e.g., REs carrying CSI report). In some embodiments, in a last symbol (e.g., of a slot, mini-slot, or subframe), CSI report may be transmitted on both edges of one or more allocated resources while HARQ-ACK feedback may be transmitted in a center of the allocated resources.

A second structure 720 may span a portion of a slot or a subframe in time (e.g., an end portion of a slot or a subframe), may extend over a plurality of OFDM symbols, and may extend over a plurality of subcarrier frequencies. In various embodiments, second structure 720 may carry various PUCCH REs.

For example, second structure 720 may comprise one or more UCI type 2 REs 725 (e.g., REs carrying HARQ-ACK) and one or more UCI type 1 REs 726 (e.g., REs carrying CSI report). In some embodiments, HARQ-ACK feedback may be transmitted adjacent to DM-RS, and may be allocated in distributed resources. For example, in a last symbol (e.g., of a slot, mini-slot, or subframe), HARQ-ACK feedback may be transmitted in resources distributed among resources carrying DM-RS.

Various embodiments discussed herein may incorporate mechanisms and methods related to multiplexing of short UCI and/or short data. As discussed herein, in embodiments in which short UL data and short UL control channel are scheduled in non-contiguous frequency resources, IMD may be expected. This might not be desirable for power limited-scenarios, since a UE may be disposed to performing power backoff for UL transmission as a result. To alleviate potential IMD issues, an eNB or gNB may indicate that a UE should transmit short UL control and/or short data channels in contiguous resources.

To further improve the robustness of UL control channel, embodiments of resource mapping and/or multiplexing schemes for short UCI on short data channel are discussed herein.

In some embodiments, short PUCCH may be allocated in resources adjacent to the transmission of short PUSCH. In particular, short PUCCH may be transmitted on one side of short PUSCH.

Figure 8:
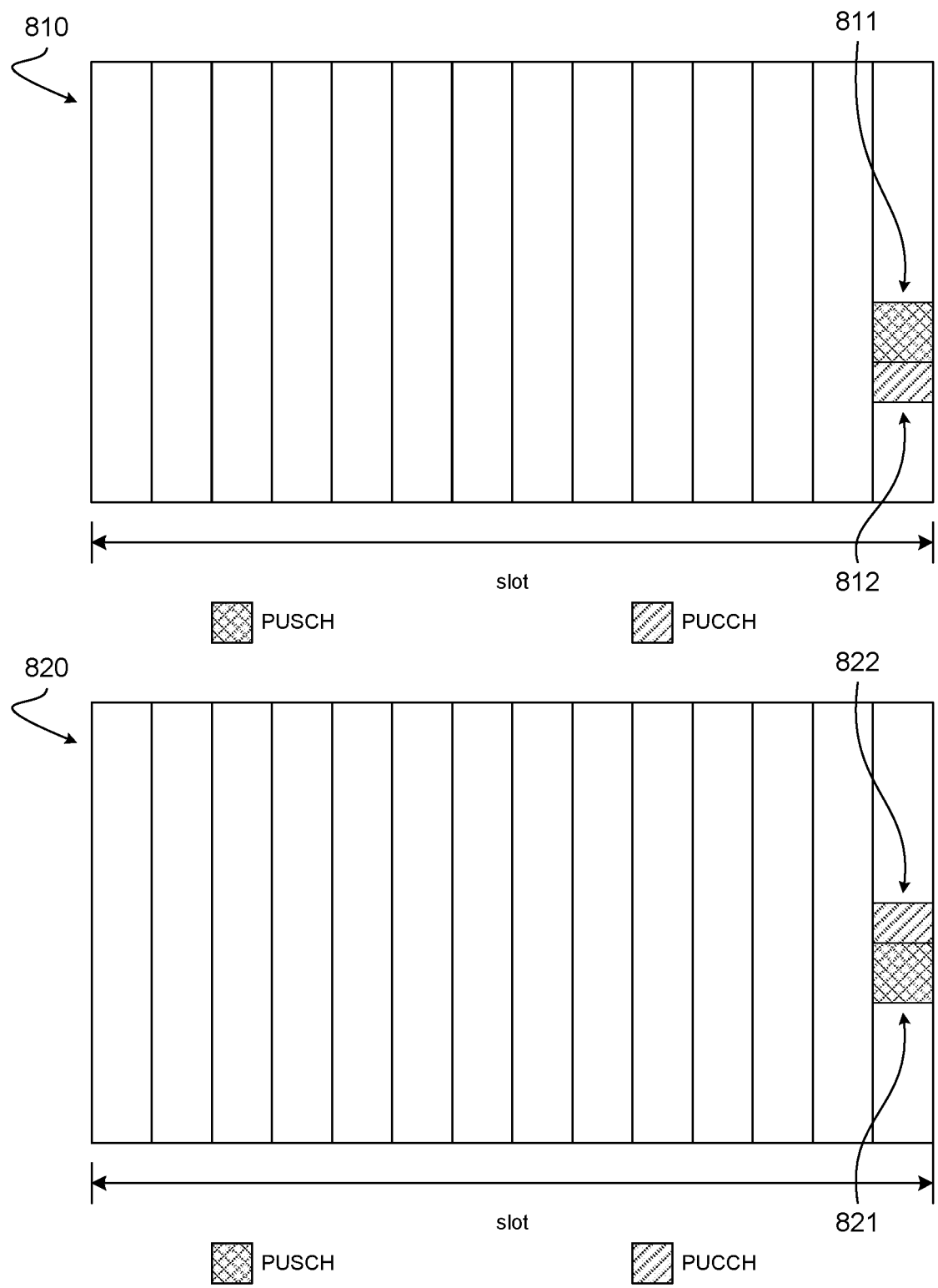
FIG. 8 illustrates scenarios of contiguous resources for short PUCCH and short PUSCH, in accordance with some embodiments of the disclosure.

FIG. 8 illustrates scenarios of contiguous resources for short PUCCH and short PUSCH, in accordance with some embodiments of the disclosure. A first structure 810 may span a slot (or a subframe) in time, may extend over a plurality of OFDM symbols, and may extend over a plurality of subcarrier frequencies. At the end of the slot (e.g., in one or more OFDM symbols), first structure 810 may comprise a PUSCH 811 and a PUCCH 812, each of which may span one or more subcarrier frequencies.

PUSCH 811 and PUCCH 812 may span contiguous sets of frequency resources. In various embodiments, PUCCH 812 may extend from a lower boundary or side of PUSCH 811 (e.g., a lower-frequency boundary or side of PUSCH 811).

A second structure 820 may span a slot (or a subframe) in time, may extend over a plurality of OFDM symbols, and may extend over a plurality of subcarrier frequencies. At the end of the slot (e.g., in one or more OFDM symbols), second structure 820 may comprise a PUSCH 821 and a PUCCH 822, each of which may span one or more subcarrier frequencies.

PUSCH 821 and PUCCH 822 may span contiguous sets of frequency resources. In various embodiments, PUCCH 822 may extend from an upper boundary or side of PUSCH 821 (e.g., an upper-frequency boundary or side of PUSCH 821).

In some embodiments, in cases in which HARQ-ACK and other UCI are combined and carried by a short PUCCH, HARQ-ACK may be transmitted adjacent to short PUSCH, which may advantageously provide better channel estimation performance. Remaining REs may then be used for transmission of other UCI information.

For some embodiments, short UCI may be transmitted on both edges of a set of resources (e.g., frequency resources) allocated for UL data transmission. This may advantageously improve a robustness of UL control channel transmission by virtue of the benefits of frequency diversity.

Figure 9:
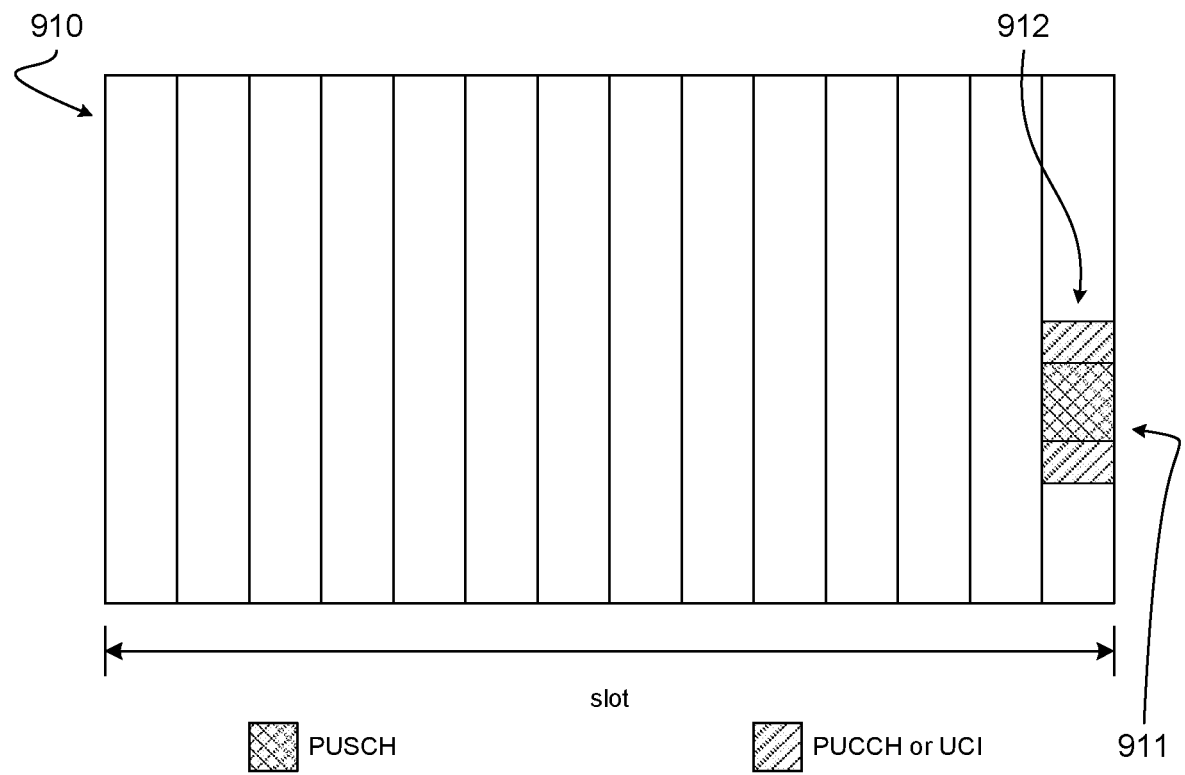
FIG. 9 illustrates a scenario of short UCI allocated on both edges of short PUSCH, in accordance with some embodiments of the disclosure.

FIG. 9 illustrates a scenario of short UCI allocated on both edges of short PUSCH, in accordance with some embodiments of the disclosure. A structure 910 may span a slot (or a subframe) in time, may extend over a plurality of OFDM symbols, and may extend over a plurality of subcarrier frequencies. At the end of the slot (e.g., in one or more OFDM symbols), structure 910 may comprise one or more PUSCH regions 911 and one or more PUCCH regions 912, each of which may span one or more subcarrier frequencies.

PUSCH regions 911 and PUCCH regions 912 may span contiguous sets of frequency resources. In various embodiments, PUCCH regions 912 may surround PUSCH regions 911, or PUSCH regions 911 may surround PUCCH regions 912. For example, in some embodiments, one PUCCH region 912 may extend from an upper boundary or side of PUSCH 911 (e.g., an upper-frequency boundary or side of PUSCH 911), and another PUCCH region 912 may extend from a lower boundary or side of PUSCH 911 (e.g., a lower-frequency boundary or side of PUSCH 911). As an alternate example, in some embodiments, one PUSCH region 911 may extend from an upper boundary or side of PUCCH 912 (e.g., an upper-frequency boundary or side of PUCCH 912) and another PUSCH region 911 may extend from a lower boundary or side of PUCCH 912 (e.g., a lower-frequency boundary or side of PUCCH 912).

For some embodiments, in cases in which HARQ-ACK and other UCI information are combined and carried by short PUCCH, HARQ-ACK may be transmitted adjacent to short PUSCH, which may advantageously provide better channel estimation performance. Remaining REs may then be used for the transmitted of other UCI information.

In some embodiments, under various multiplexing schemes, short UCI may be interleaved with UL data transmission (e.g., short PUSCH). This may advantageously improve channel estimation performance for short UL control channel, for example if DM-RS for UL data transmission may be reused for UL control channel transmission.

In various embodiments, whether short PUCCH is positioned for transmission on an upper side of a short PUSCH and/or a lower side of a short PUSCH may be configured by higher layers, or may be dynamically indicated in the Downlink Control Information (DCI).

Figure 10:
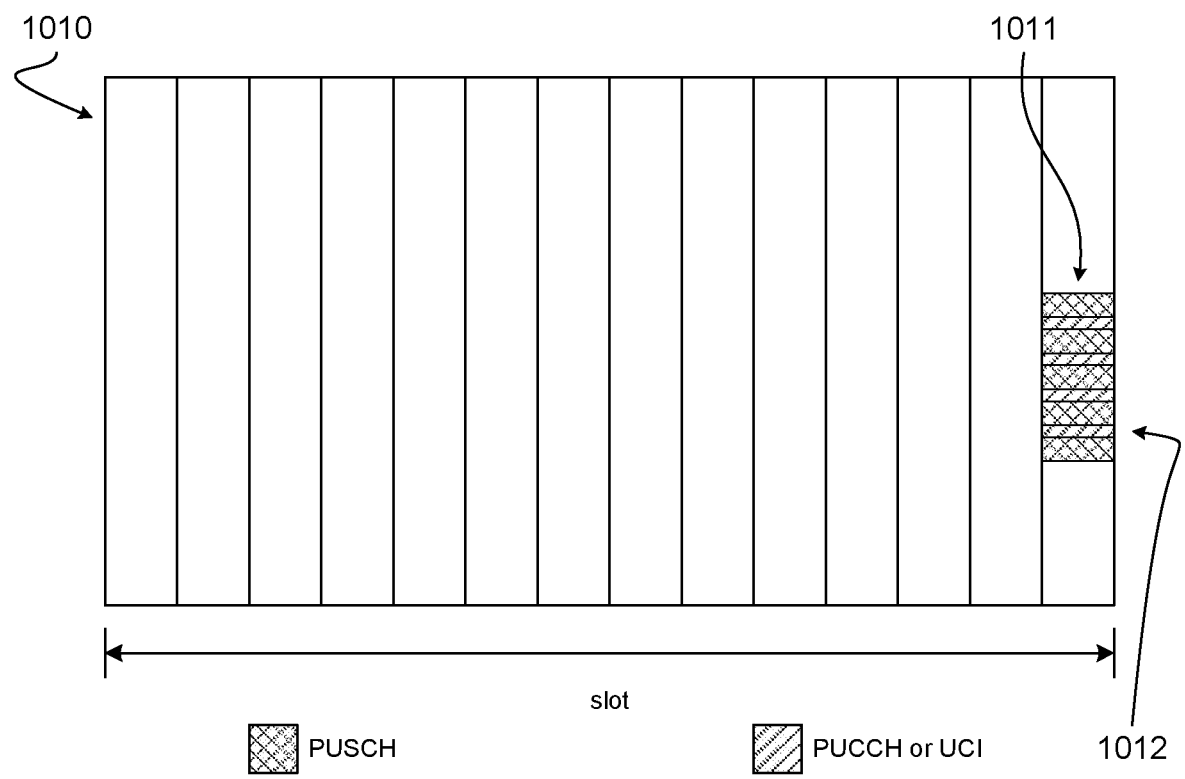
FIG. 10 illustrates a scenario of short UCI interleaved with short data transmission, in accordance with some embodiments of the disclosure.

FIG. 10 illustrates a scenario of short UCI interleaved with short data transmission, in accordance with some embodiments of the disclosure. A structure 1010 may span a slot (or a subframe) in time, may extend over a plurality of OFDM symbols, and may extend over a plurality of subcarrier frequencies. At the end of the slot (e.g., in one or more OFDM symbols), structure 1010 may comprise one or more PUSCH regions 1011 and one or more PUCCH regions 1012, each of which may span one or more subcarrier frequencies.

PUSCH regions 1011 and PUCCH regions 1012 may span contiguous sets of frequency resources. In various embodiments, one or more PUCCH regions 1012 and one or more PUSCH regions 1011 may be interspersed. For example, in some embodiments, a plurality of PUCCH regions 1012 may be interleaved or interspersed between a plurality of PUSCH regions 1011. As an alternate example, in some embodiments, a plurality of PUSCH regions 1011 may be interleaved or interspersed between a plurality of PUCCH regions 1012.

In various embodiments, HARQ-ACK feedback may be transmitted adjacent to DM-RS for better channel estimation quality. Alternatively, HARQ-ACK feedback may puncture short data. For various embodiments, the multiplexing schemes discussed herein may be straightforwardly extended to cases having short PUCCH and long PUSCH. For example, in some embodiments, short PUCCH or UCI may be allocated on the edge of long PUSCH in the one or more of the last symbols within one slot (or mini-slot, or subframe), or may be interleaved with long PUSCH in one or more of the last symbols within one slot (or mini-slot, or subframe).

Various embodiments discussed herein may accordingly incorporate mechanisms and methods related to multiplexing of long UCI and data. Various embodiments may support FDM based multiplexing of long UCI and data, as described and depicted herein.

Long UCI may be transmitted adjacent to a PUSCH transmission, which may in turn advantageously facilitate or enable a reduction of IMD compared to cases in which a long UCI is transmitted on frequency resources distant from a PUSCH transmission. For some embodiments, when long UCI is transmitted on PUCCH, the PUCCH may be transmitted adjacent to PUSCH. In some embodiments, the PUCCH may be transmitted on one or more pre-configured resources (e.g., frequency resources).

Figure 11A:
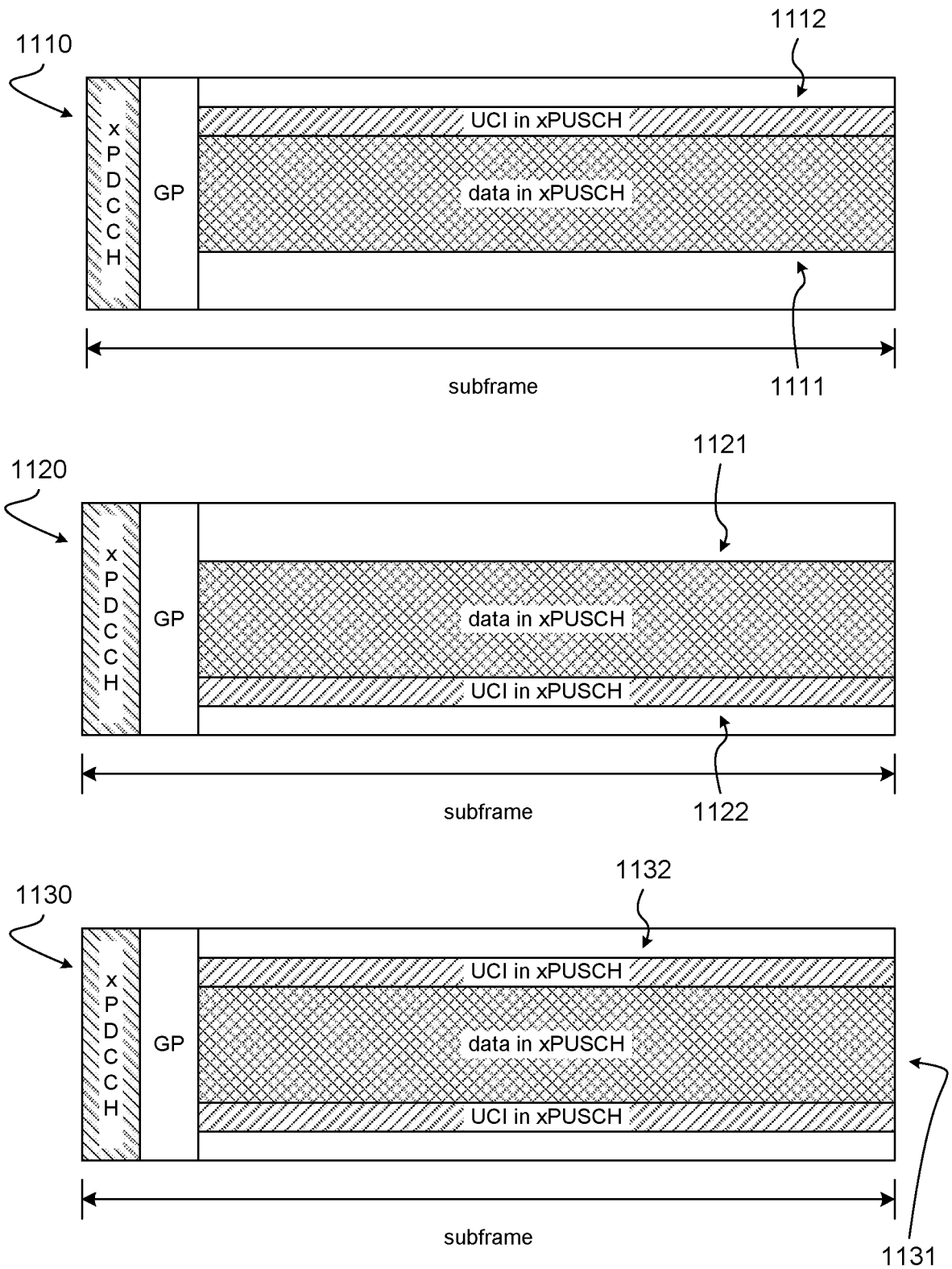

FIGS. 11A-11B illustrate Frequency Division Multiplexing (FDM) of long UCI and data, in accordance with some embodiments of the disclosure. A first structure 1110, a second structure 1120, a third structure 1130, a fourth structure 1140, and a fifth structure 1150 may correspond with scenarios of 5G PDCCH (xPDCCH) followed by 5G PUSCH (xPUSCH) carrying data and/or UCI. These scenarios may be similar to the long PUCCH scenarios described herein. In various embodiments, similar scenarios may accordingly comprise PDCCH followed by PUSCH and/or PUCCH, respectively.

A first structure 1110 may span a subframe (or slot) in time, and may comprise both UL and DL channels spanning shared frequency resources. First structure 1110 may accordingly extend over a plurality of OFDM symbols and extend over a plurality of subcarrier frequencies. First structure 1110 may comprise an xPDCCH, followed by a GP, followed by data 1111 in xPUSCH and UCI 1112 in xPUSCH, with data 1111 and UCI 1112 being multiplexed in an FDM manner.

In various embodiments, data 1111 and UCI 1112 may span contiguous sets of frequency resources. In various embodiments, UCI 1112 may extend from an upper boundary or side of data 1111 (e.g., an upper-frequency boundary or side of data 1111).

A second structure 1120 may span a subframe (or slot) in time, and may comprise both UL and DL channels spanning shared frequency resources. Second structure 1120 may accordingly extend over a plurality of OFDM symbols and extend over a plurality of subcarrier frequencies. Second structure 1120 may comprise an xPDCCH, followed by a GP, followed by data 1121 in xPUSCH and UCI 1122 in xPUSCH, with data 1121 and UCI 1122 being multiplexed in an FDM manner.

In various embodiments, data 1121 and UCI 1122 may span contiguous sets of frequency resources. In various embodiments, UCI 1122 may extend from a lower boundary or side of data 1121 (e.g., a lower-frequency boundary or side of data 1121).

A third structure 1130 may span a subframe (or slot) in time, and may comprise both UL and DL channels spanning shared frequency resources. Third structure 1130 may accordingly extend over a plurality of OFDM symbols and extend over a plurality of subcarrier frequencies. Third structure 1130 may comprise an xPDCCH, followed by a GP, followed by data 1131 in xPUSCH and UCI 1132 in xPUSCH, with data 1131 and UCI 1132 being multiplexed in an FDM manner.

In various embodiments, data 1131 and UCI 1132 may span contiguous sets of frequency resources. In various embodiments, UCI 1132 may surround data 1131. For example, in some embodiments, one region of UCI 1132 may extend from an upper boundary or side of data 1131 (e.g., an upper-frequency boundary or side of data 1131), and another region of UCI 1132 may extend from a lower boundary or side of data 1131 (e.g., a lower-frequency boundary or side of data 1131).

A fourth structure 1140 may span a subframe (or slot) in time, and may comprise both UL and DL channels spanning shared frequency resources. Fourth structure 1140 may accordingly extend over a plurality of OFDM symbols and extend over a plurality of subcarrier frequencies. Fourth structure 1140 may comprise an xPDCCH, followed by a GP, followed by data 1141 in xPUSCH and UCI 1142 in xPUSCH, with data 1141 and UCI 1142 being multiplexed in an FDM manner.

In various embodiments, data 1141 and UCI 1142 may span contiguous sets of frequency resources, and UCI 1142 in different OFDM symbols may be multiplexed in an FDM manner. For example, in some embodiments, a first region of UCI 1142 earlier in the subframe may extend from an upper boundary or side of data 1141 (e.g., an upper-frequency boundary or side of data 1141), and a second region of UCI 1142 later in the subframe may extend from a lower boundary or side of data 1141 (e.g., a lower-frequency boundary or side of data 1141).

A fifth structure 1150 may span a subframe (or slot) in time, and may comprise both UL and DL channels spanning shared frequency resources. Fifth structure 1150 may accordingly extend over a plurality of OFDM symbols and extend over a plurality of subcarrier frequencies. Fifth structure 1150 may comprise an xPDCCH, followed by a GP, followed by data 1151 in xPUSCH and UCI 1152 in xPUSCH, with data 1151 and UCI 1152 being multiplexed in an FDM manner.

In various embodiments, data 1151 and UCI 1152 may span contiguous sets of frequency resources, and UCI 1152 in different OFDM symbols may be multiplexed in an FDM manner. For example, in some embodiments, a first region of UCI 1152 earlier in the subframe may extend from a lower boundary or side of data 1151 (e.g., a lower-frequency boundary or side of data 1151), and a second region of UCI 1152 later in the subframe may extend from an upper boundary or side of data 1151 (e.g., an upper-frequency boundary or side of data 1151).

Table 1 below illustrates an example of preconfiguring some candidate resources for long PUCCH transmission and indicating long PUCCH resource values using DCI. More specifically, in accordance with the mapping defined in Table 1, a long PUCCH resource allocation field in DCI may be used to determine PUCCH resource values (or 5G PUCCH (xPUCCH) resource values) from one of four PUCCH resource values configured by higher layers.

TABLE 1

Resource index values for long PUCCH resource allocation

| bit field in DCI for PUCCH resource allocation | Resource index |
|---|---|
| $1^{st}$ value (e.g., "00") | The 1st xPUCCH resource value configured by the higher layers |
| $2^{nd}$ value (e.g., "01") | The 2nd xPUCCH resource value configured by the higher layers |
| $3^{rd}$ value (e.g., "10") | The 3rd xPUCCH resource value configured by the higher layers |
| $4^{th}$ value (e.g., "11") | The 4th xPUCCH resource value configured by the higher layers |

For some embodiments, whether to transmit long PUCCH on one or more pre-configured resources, or whether to transmit long PUCCH adjacent to PUSCH transmission, may be configured via higher layers by including a field or combining with other information to indicate which transmission mode to apply to for a UE. In various embodiments, this indication may be signaled via UE-specific Radio Resource Control (RRC), or by cell-specific configuration via system information signaling.

In some embodiments, system information signaling may comprise MIB (Master Information Block) carried on PBCH (Physical Broadcast Channel) or SIB (System Information Block). For some embodiments, system information signaling may comprise Minimum System Information (MSI), Remaining Minimum System Information (RMSI), and/or Other System Information (OSI).

For UE-specific indications, DCI may inform a UE whether to send a long PUCCH adjacent to a PUSCH transmission as an additional indication method, or whether to override the configuration via higher layer signaling. For some embodiments, the various signaling mechanisms may also be applied in cases in which short PUCCH is multiplexing with short PUSCH or long PUSCH.

Figure 12:
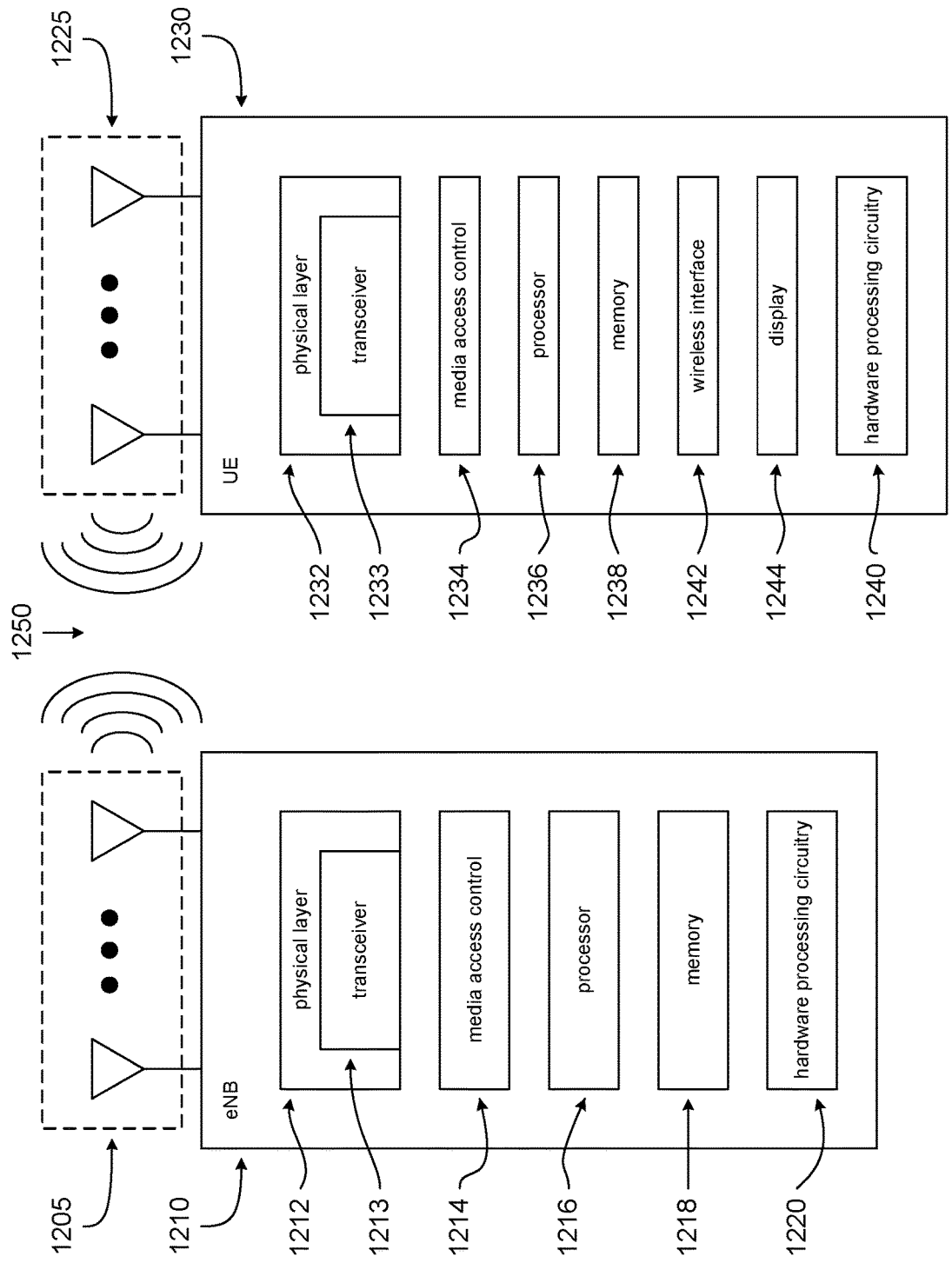
FIG. 12 illustrates an Evolved Node B (eNB) and a User Equipment (UE), in accordance with some embodiments of the disclosure.

FIG. 12 illustrates an eNB and a UE, in accordance with some embodiments of the disclosure. FIG. 12 includes block diagrams of an eNB 1210 and a UE 1230 which are operable to co-exist with each other and other elements of an LTE network. High-level, simplified architectures of eNB 1210 and UE 1230 are described so as not to obscure the embodiments. It should be noted that in some embodiments, eNB 1210 may be a stationary non-mobile device.

eNB 1210 is coupled to one or more antennas 1205, and UE 1230 is similarly coupled to one or more antennas 1225. However, in some embodiments, eNB 1210 may incorporate or comprise antennas 1205, and UE 1230 in various embodiments may incorporate or comprise antennas 1225.

In some embodiments, antennas 1205 and/or antennas 1225 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 1205 are separated to take advantage of spatial diversity.

eNB 1210 and UE 1230 are operable to communicate with each other on a network, such as a wireless network. eNB 1210 and UE 1230 may be in communication with each other over a wireless communication channel 1250, which has both a downlink path from eNB 1210 to UE 1230 and an uplink path from UE 1230 to eNB 1210.

As illustrated in FIG. 12, in some embodiments, eNB 1210 may include a physical layer circuitry 1212, a MAC (media access control) circuitry 1214, a processor 1216, a memory 1218, and a hardware processing circuitry 1220. A person skilled in the art will appreciate that other components not shown may be used in addition to the components shown to form a complete eNB.

In some embodiments, physical layer circuitry 1212 includes a transceiver 1213 for providing signals to and from UE 1230. Transceiver 1213 provides signals to and from UEs or other devices using one or more antennas 1205. In some embodiments, MAC circuitry 1214 controls access to the wireless medium. Memory 1218 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 1220 may comprise logic devices or circuitry to perform various operations. In some embodiments, processor 1216 and memory 1218 are arranged to perform the operations of hardware processing circuitry 1220, such as operations described herein with reference to logic devices and circuitry within eNB 1210 and/or hardware processing circuitry 1220.

Accordingly, in some embodiments, eNB 1210 may be a device comprising an application processor, a memory, one or more antenna ports, and an interface for allowing the application processor to communicate with another device.

As is also illustrated in FIG. 12, in some embodiments, UE 1230 may include a physical layer circuitry 1232, a MAC circuitry 1234, a processor 1236, a memory 1238, a hardware processing circuitry 1240, a wireless interface 1242, and a display 1244. A person skilled in the art would appreciate that other components not shown may be used in addition to the components shown to form a complete UE.

In some embodiments, physical layer circuitry 1232 includes a transceiver 1233 for providing signals to and from eNB 1210 (as well as other eNBs). Transceiver 1233 provides signals to and from eNBs or other devices using one or more antennas 1225. In some embodiments, MAC circuitry 1234 controls access to the wireless medium. Memory 1238 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 1242 may be arranged to allow the processor to communicate with another device. Display 1244 may provide a visual and/or tactile display for a user to interact with UE 1230, such as a touch-screen display. Hardware processing circuitry 1240 may comprise logic devices or circuitry to perform various operations. In some embodiments, processor 1236 and memory 1238 may be arranged to perform the operations of hardware processing circuitry 1240, such as operations described herein with reference to logic devices and circuitry within UE 1230 and/or hardware processing circuitry 1240.

Accordingly, in some embodiments, UE 1230 may be a device comprising an application processor, a memory, one or more antennas, a wireless interface for allowing the application processor to communicate with another device, and a touch-screen display.

Elements of FIG. 12, and elements of other figures having the same names or reference numbers, can operate or function in the manner described herein with respect to any such figures (although the operation and function of such elements is not limited to such descriptions). For example, FIGS. 13 and 16-17 also depict embodiments of eNBs, hardware processing circuitry of eNBs, UEs, and/or hardware processing circuitry of UEs, and the embodiments described with respect to FIG. 12 and FIGS. 13 and 16-17 can operate or function in the manner described herein with respect to any of the figures.

In addition, although eNB 1210 and UE 1230 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 13:
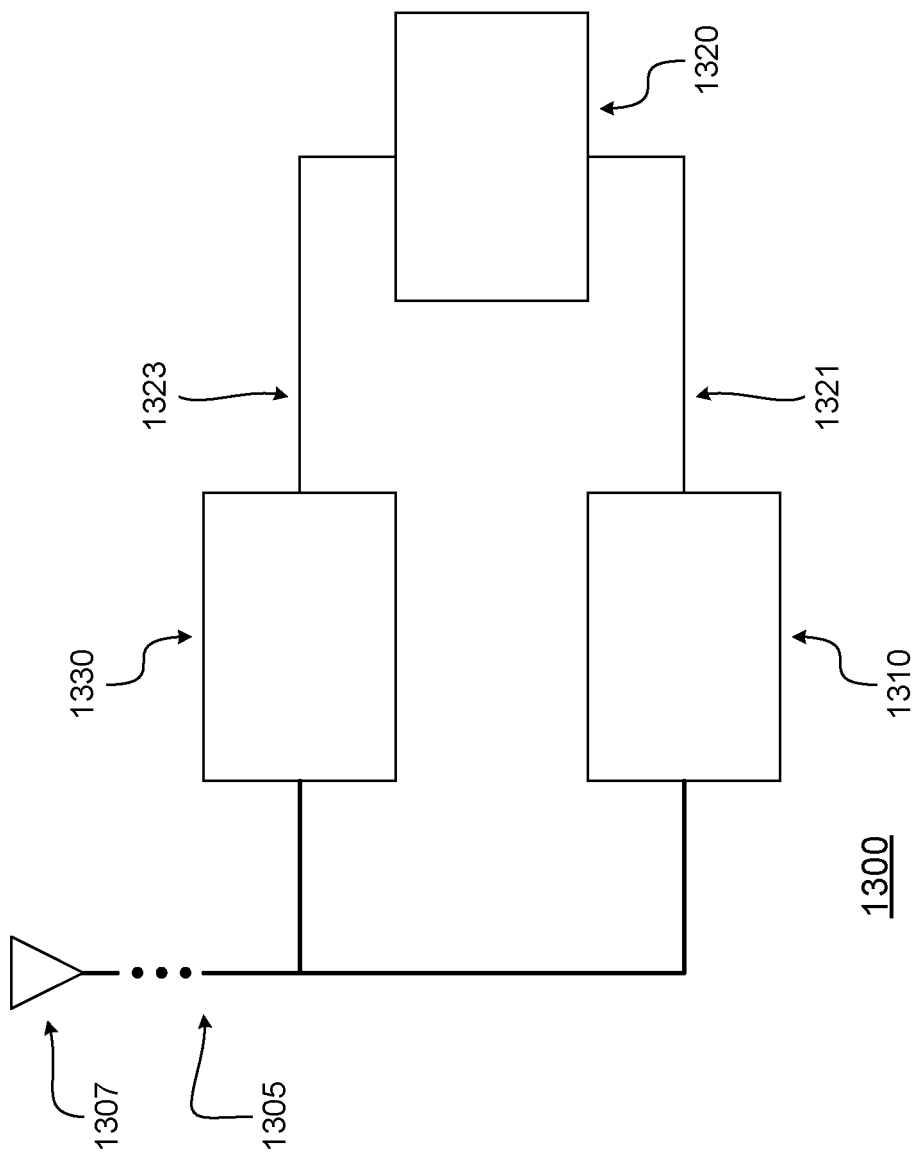
FIG. 13 illustrates hardware processing circuitries for a UE for multiplexing UL control channel and UL data channel, in accordance with some embodiments of the disclosure.

FIG. 13 illustrates hardware processing circuitries for a UE for multiplexing UL control channel and UL data channel, in accordance with some embodiments of the disclosure. With reference to FIG. 12, a UE may include various hardware processing circuitries discussed herein (such as hardware processing circuitry 1300 of FIG. 13), which may in turn comprise logic devices and/or circuitry operable to perform various operations. For example, in FIG. 12, UE 1230 (or various elements or components therein, such as hardware processing circuitry 1240, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 1236 (and/or one or more other processors which UE 1230 may comprise), memory 1238, and/or other elements or components of UE 1230 (which may include hardware processing circuitry 1240) may be arranged to perform the operations of these hardware processing circuitries, such as operations described herein with reference to devices and circuitry within these hardware processing circuitries. In some embodiments, processor 1236 (and/or one or more other processors which UE 1230 may comprise) may be a baseband processor.

Returning to FIG. 13, an apparatus of UE 1230 (or another UE or mobile handset), which may be operable to communicate with one or more eNBs on a wireless network, may comprise hardware processing circuitry 1300. In some embodiments, hardware processing circuitry 1300 may comprise one or more antenna ports 1305 operable to provide various transmissions over a wireless communication channel (such as wireless communication channel 1250). Antenna ports 1305 may be coupled to one or more antennas 1307 (which may be antennas 1225). In some embodiments, hardware processing circuitry 1300 may incorporate antennas 1307, while in other embodiments, hardware processing circuitry 1300 may merely be coupled to antennas 1307.

Antenna ports 1305 and antennas 1307 may be operable to provide signals from a UE to a wireless communications channel and/or an eNB, and may be operable to provide signals from an eNB and/or a wireless communications channel to a UE. For example, antenna ports 1305 and antennas 1307 may be operable to provide transmissions from UE 1230 to wireless communication channel 1250 (and from there to eNB 1210, or to another eNB). Similarly, antennas 1307 and antenna ports 1305 may be operable to provide transmissions from a wireless communication channel 1250 (and beyond that, from eNB 1210, or another eNB) to UE 1230.

Hardware processing circuitry 1300 may comprise various circuitries operable in accordance with the various embodiments discussed herein. With reference to FIG. 13, hardware processing circuitry 1300 may comprise a first circuitry 1310, a second circuitry 1320, and/or a third circuitry 1330.

In a variety of embodiments, first circuitry 1310 may be operable to process a PDCCH within a bandwidth at a start of a slot. Second circuitry 1320 may be operable to allocate a GP within the bandwidth and subsequent to the PDCCH. Second circuitry 1320 may be operable to provide information regarding the allocated GP (e.g., an extent of the GP in either time-domain or frequency-domain resources) to first circuitry 1310 via an interface 1321, and/or may be operable to provide information regarding the allocated GP to third circuitry 1330 via an interface 1323. Third circuitry 1330 may be operable to generate a PUCCH within the bandwidth and in one or more OFDM symbols at the end of the slot. Third circuitry 1330 may also be operable to generate a PUSCH within the bandwidth and in one or more OFDM symbols extending between the GP and the PUCCH, the PUSCH being time-division multiplexed with the PUCCH. Hardware processing circuitry 1300 may comprise an interface for receiving the PDCCH from a receiving circuitry and/or for sending the PUCCH and the PUSCH to a transmission circuitry.

In some embodiments, the PUCCH and at least part of the PUSCH may be within the same OFDM symbols and/or may be within different frequency resources. For some embodiments, the PUCCH may comprise a first part carrying HARQ ACK feedback and/or a second part containing other UCI information. In some embodiments, the PUCCH may comprise a first part carrying a first type of UCI and/or a second part carrying a second type of UCI, and the first part and the second part may be within different frequency resources.

In some embodiments, the PUCCH may comprise a first part carrying DM-RS and/or a second part carrying HARQ ACK feedback, and the second part may be carried on one or more REs adjacent in frequency to the first part. For some embodiments, the PUCCH may comprise HARQ ACK feedback distributed among the frequency resources of the PUCCH.

In some embodiments, the PUCCH may span two OFDM symbols, a CSI report may be carried in a second-to-last OFDM symbol of the two OFDM symbols, and HARQ ACK feedback may be carried in a last OFDM symbol of the two OFDM symbols. For some embodiments, HARQ ACK feedback may be carried in a first set of frequency resources. In some embodiments, a CSI report may be carried in two second sets of frequency resources surrounding the first set of frequency resources.

For some embodiments, the PUCCH may comprise HARQ ACK feedback carried in a first set of frequency resources, and the PUCCH may comprise DM-RS carried in a second set of frequency resources adjacent to the first set of frequency resources. In some embodiments, the PUCCH may span two OFDM symbols, and the PUCCH may comprise DM-RS carried in the first OFDM symbol.

In some embodiments, third circuitry 1330 may be operable to generate an additional PUSCH in frequency resources adjacent to the PUCCH.

For some embodiments, a UCI of the PUCCH may be carried in two sets of frequency resources adjacent to two respectively corresponding edges of the set of frequency resources carrying the additional PUSCH. In some embodiments, a UCI of the PUCCH may be carried in a set of frequency resources interleaved with a set of frequency resources carrying the additional PUSCH.

In a variety of embodiments, first circuitry 1310 may be operable to process a PDCCH within a bandwidth at a start of a slot. Second circuitry 1320 may be operable to allocate a GP within the bandwidth and subsequent to the PDCCH. Second circuitry 1320 may be operable to provide information regarding the allocated GP (e.g., an extent of the GP in either time-domain or frequency-domain resources) to first circuitry 1310 via an interface 1321, and/or may be operable to provide information regarding the allocated GP to third circuitry 1330 via an interface 1323. Third circuitry 1330 may be operable to generate a PUCCH in one or more subcarrier frequencies within the bandwidth and extending between the GP and an end of the slot. Third circuitry 1340 may also be operable to generate a PUSCH in one or more subcarrier frequencies within the bandwidth and extending between the GP and the end of the slot, the PUSCH being frequency-division multiplexed with the PUCCH. Hardware processing circuitry 1300 may also comprise an interface for receiving the PDCCH from a receiving circuitry and/or for sending the PUCCH and the PUSCH to a transmission circuitry.

In some embodiments, the PUSCH may be carried in a set of frequency resources adjacent to a set of frequency resources carrying the PUSCH. For some embodiments, a DCI of the PDCCH may carry a PUCCH resource allocation field to indicate a PUCCH resource value selected from a set of predetermined PUCCH resource values.

For some embodiments, first circuitry 1310 may also be operable to process a transmission carrying an indicator of a transmission mode. The transmission mode may be selected from transmitting PUCCH on a pre-configured resource, and/or transmitting PUCCH adjacent to PUSCH.

In some embodiments, the transmission carrying the indicator of the transmission mode may be one of: a UE-specific RRC transmission, a MSI transmission, a RMSI transmission, or an OSI transmission.

In some embodiments, first circuitry 1310, second circuitry 1320, and/or third circuitry 1330 may be implemented as separate circuitries. In other embodiments, first circuitry 1310, second circuitry 1320, and/or third circuitry 1330 may be combined and implemented together in a circuitry without altering the essence of the embodiments.

Figure 14:
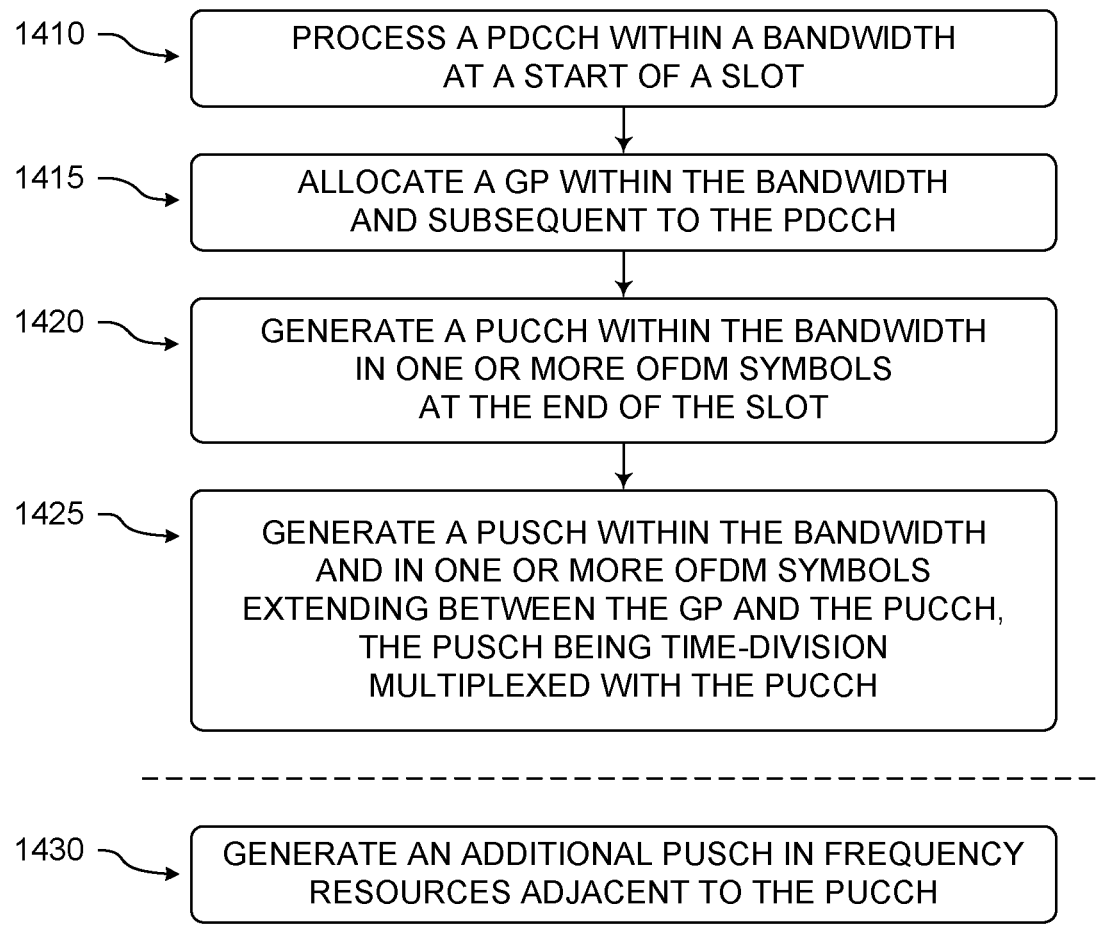
FIGS. 14 and 15 illustrate methods for a UE for multiplexing UL control channel and UL data channel, in accordance with some embodiments of the disclosure.
Figure 15:
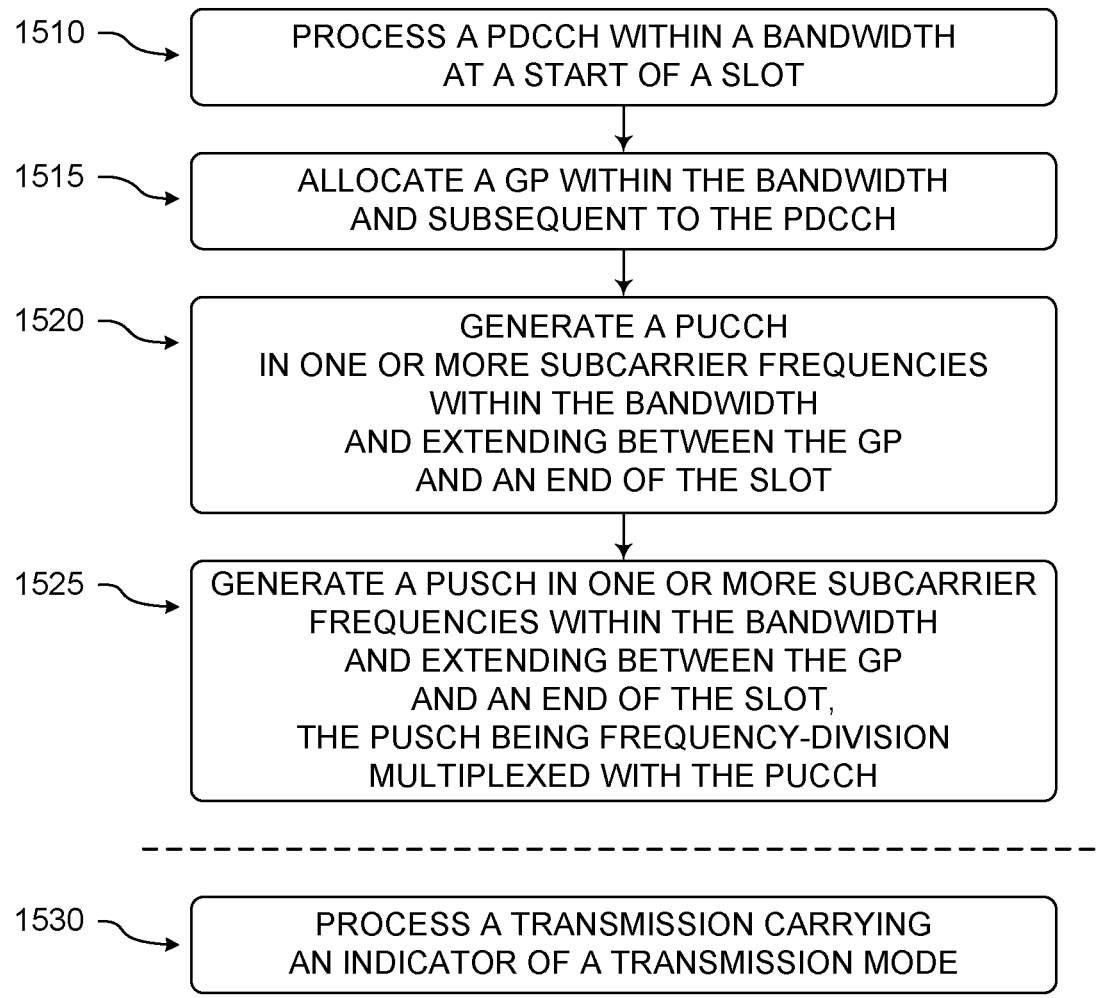

FIGS. 14 and 15 illustrate methods for a UE for multiplexing UL control channel and UL data channel, in accordance with some embodiments of the disclosure. With reference to FIG. 12, methods that may relate to UE 1230 and hardware processing circuitry 1240 are discussed herein. Although the actions in method 1400 of FIG. 14 and method 1500 of FIG. 15 are shown in a particular order, the order of the actions can be modified. Thus, the illustrated embodiments can be performed in a different order, and some actions may be performed in parallel. Some of the actions and/or operations listed in FIGS. 14 and 15 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 1230 and/or hardware processing circuitry 1240 to perform an operation comprising the methods of FIGS. 14 and 15. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 14 and 15.

Returning to FIG. 14, various methods may be in accordance with the various embodiments discussed herein. A method 1400 may comprise a processing 1410, an allocating 1415, a generating 1420, and a generating 1425. Method 1400 may also comprise a generating 1430.

In processing 1410, a PDCCH may be processed within a bandwidth at a start of a slot. In allocating 1415, a GP may be allocated within the bandwidth and subsequent to the PDCCH. In generating 1420, a PUCCH may be generated within the bandwidth and in one or more OFDM symbols at the end of the slot. In generating 1425, a PUSCH may be generated within the bandwidth and in one or more OFDM symbols extending between the GP and the PUCCH. The PUSCH may be time-division multiplexed with the PUCCH.

In some embodiments, the PUCCH and at least part of the PUSCH may be within the same OFDM symbols and/or may be within different frequency resources. For some embodiments, the PUCCH may comprise a first part carrying HARQ ACK feedback and/or a second part containing other UCI information. In some embodiments, the PUCCH may comprise a first part carrying a first type of UCI and/or a second part carrying a second type of UCI, and the first part and the second part may be within different frequency resources.

In some embodiments, the PUCCH may comprise a first part carrying DM-RS and/or a second part carrying HARQ ACK feedback, and the second part may be carried on one or more REs adjacent in frequency to the first part. For some embodiments, the PUCCH may comprise HARQ ACK feedback distributed among the frequency resources of the PUCCH.

In some embodiments, the PUCCH may span two OFDM symbols, a CSI report may be carried in a second-to-last OFDM symbol of the two OFDM symbols, and HARQ ACK feedback may be carried in a last OFDM symbol of the two OFDM symbols. For some embodiments, HARQ ACK feedback may be carried in a first set of frequency resources. In some embodiments, a CSI report may be carried in two second sets of frequency resources surrounding the first set of frequency resources.

For some embodiments, the PUCCH may comprise HARQ ACK feedback carried in a first set of frequency resources, and the PUCCH may comprise DM-RS carried in a second set of frequency resources adjacent to the first set of frequency resources. In some embodiments, the PUCCH may span two OFDM symbols, and the PUCCH may comprise DM-RS carried in the first OFDM symbol.

In some embodiments, in generating 1430, an additional PUSCH may be generated in frequency resources adjacent to the PUCCH.

For some embodiments, a UCI of the PUCCH may be carried in two sets of frequency resources adjacent to two respectively corresponding edges of the set of frequency resources carrying the additional PUSCH. In some embodiments, a UCI of the PUCCH may be carried in a set of frequency resources interleaved with a set of frequency resources carrying the additional PUSCH.

Returning to FIG. 15, various methods may be in accordance with the various embodiments discussed herein. A method 1500 may comprise a processing 1510, an allocating 1515, a generating 1520, and a generating 1525. Method 1500 may also comprise a processing 1530.

In processing 1510, a PDCCH may be processed within a bandwidth at a start of a slot. In allocating 1515, a GP may be allocated within the bandwidth and subsequent to the PDCCH. In generating 1520, a PUCCH may be generated in one or more subcarrier frequencies within the bandwidth and extending between the GP and an end of the slot. IN generating 1520, a PUSCH may be generated in one or more subcarrier frequencies within the bandwidth and extending between the GP and the end of the slot, the PUSCH being frequency-division multiplexed with the PUCCH.

In some embodiments, the PUSCH may be carried in a set of frequency resources adjacent to a set of frequency resources carrying the PUSCH. For some embodiments, a DCI of the PDCCH may carry a PUCCH resource allocation field to indicate a PUCCH resource value selected from a set of predetermined PUCCH resource values.

For some embodiments, in processing 1530, a transmission carrying an indicator of a transmission mode may be processed. The transmission mode may be selected from transmitting PUCCH on a pre-configured resource, and/or transmitting PUCCH adjacent to PUSCH.

In some embodiments, the transmission carrying the indicator of the transmission mode may be one of: a UE-specific RRC transmission, a MSI transmission, a RMSI transmission, or an OSI transmission.

Figure 16:
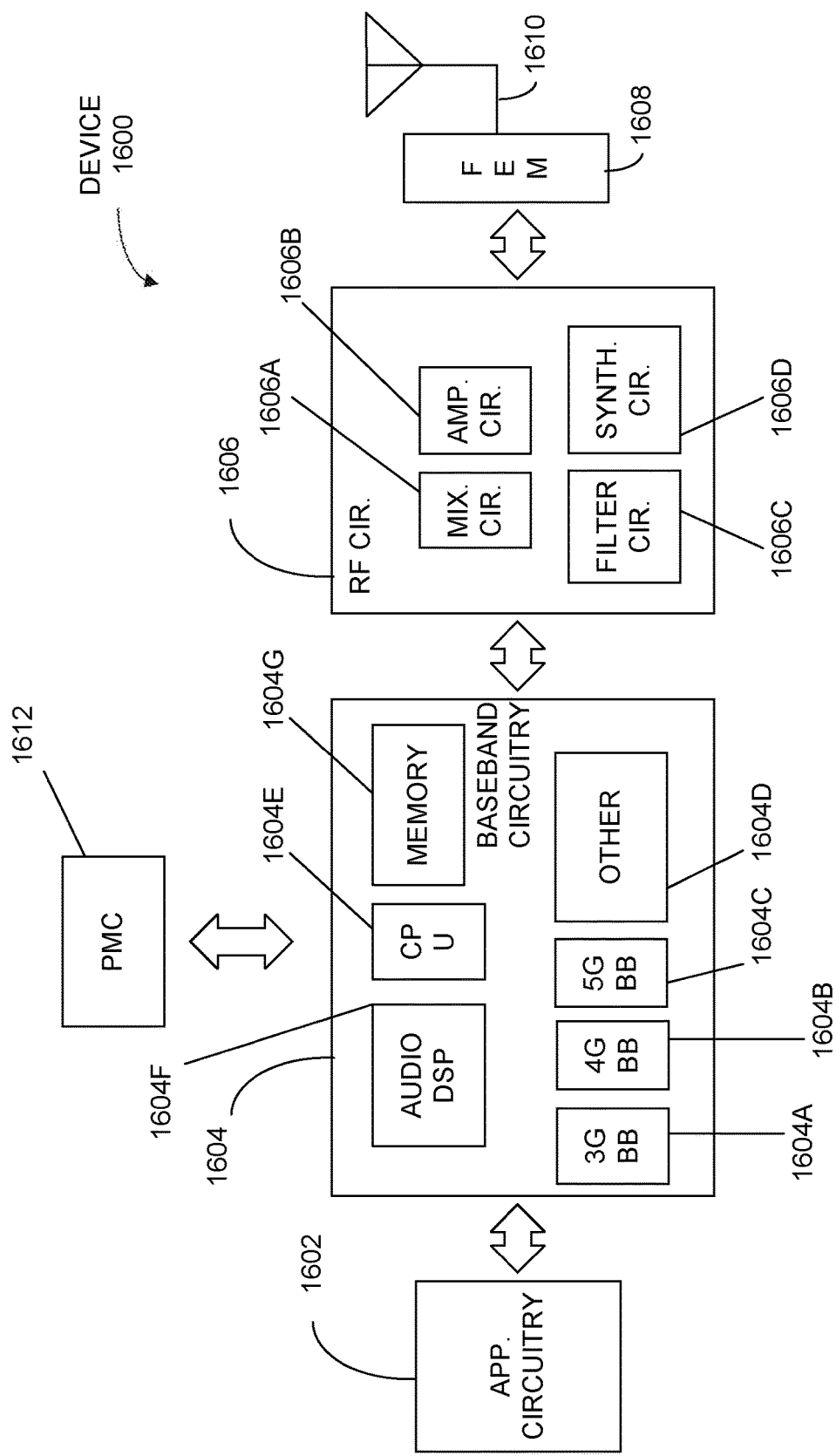
FIG. 16 illustrates example components of a device, in accordance with some embodiments of the disclosure.

FIG. 16 illustrates example components of a device, in accordance with some embodiments of the disclosure. In some embodiments, the device 1600 may include application circuitry 1602, baseband circuitry 1604, Radio Frequency (RF) circuitry 1606, front-end module (FEM) circuitry 1608, one or more antennas 1610, and power management circuitry (PMC) 1612 coupled together at least as shown. The components of the illustrated device 1600 may be included in a UE or a RAN node. In some embodiments, the device 1600 may include less elements (e.g., a RAN node may not utilize application circuitry 1602, and instead include a processor/controller to process IP data received from an EPC). In some embodiments, the device 1600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 1600. In some embodiments, processors of application circuitry 1602 may process IP data packets received from an EPC.

The baseband circuitry 1604 may include circuitry such as, but not limited to, one or more single-core or multi-core processors. The baseband circuitry 1604 may include one or more baseband processors or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a third generation (3G) baseband processor 1604A, a fourth generation (4G) baseband processor 1604B, a fifth generation (5G) baseband processor 1604C, or other baseband processor(s) 1604D for other existing generations, generations in development or to be developed in the future (e.g., second generation (2G), sixth generation (6G), and so on). The baseband circuitry 1604 (e.g., one or more of baseband processors 1604A-D) may handle various radio control functions that enable communication with one or more radio networks via the RF circuitry 1606. In other embodiments, some or all of the functionality of baseband processors 1604A-D may be included in modules stored in the memory 1604G and executed via a Central Processing Unit (CPU) 1604E. The radio control functions may include, but are not limited to, signal modulation/demodulation, encoding/decoding, radio frequency shifting, and so on. In some embodiments, modulation/demodulation circuitry of the baseband circuitry 1604 may include Fast-Fourier Transform (FFT), precoding, or constellation mapping/demapping functionality. In some embodiments, encoding/decoding circuitry of the baseband circuitry 1604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include one or more audio digital signal processor(s) (DSP) 1604F. The audio DSP(s) 1604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, and so on to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the receive signal path of the RF circuitry 1606 may include mixer circuitry 1606A, amplifier circuitry 1606B and filter circuitry 1606C. In some embodiments, the transmit signal path of the RF circuitry 1606 may include filter circuitry 1606C and mixer circuitry 1606A. RF circuitry 1606 may also include synthesizer circuitry 1606D for synthesizing a frequency for use by the mixer circuitry 1606A of the receive signal path and the transmit signal path. In some embodiments, the mixer circuitry 1606A of the receive signal path may be configured to down-convert RF signals received from the FEM circuitry 1608 based on the synthesized frequency provided by synthesizer circuitry 1606D. The amplifier circuitry 1606B may be configured to amplify the down-converted signals and the filter circuitry 1606C may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606A of the receive signal path may comprise passive mixers, although the scope of the embodiments is not limited in this respect.

In some embodiments, the mixer circuitry 1606A of the transmit signal path may be configured to up-convert input baseband signals based on the synthesized frequency provided by the synthesizer circuitry 1606D to generate RF output signals for the FEM circuitry 1608. The baseband signals may be provided by the baseband circuitry 1604 and may be filtered by filter circuitry 1606C.

In some embodiments, the mixer circuitry 1606A of the receive signal path and the mixer circuitry 1606A of the transmit signal path may include two or more mixers and may be arranged for quadrature downconversion and upconversion, respectively. In some embodiments, the mixer circuitry 1606A of the receive signal path and the mixer circuitry 1606A of the transmit signal path may include two or more mixers and may be arranged for image rejection (e.g., Hartley image rejection). In some embodiments, the mixer circuitry 1606A of the receive signal path and the mixer circuitry 1606A may be arranged for direct downconversion and direct upconversion, respectively. In some embodiments, the mixer circuitry 1606A of the receive signal path and the mixer circuitry 1606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606D may be a fractional-N synthesizer or a fractional N/N+1 synthesizer, although the scope of the embodiments is not limited in this respect as other types of frequency synthesizers may be suitable. For example, synthesizer circuitry 1606D may be a delta-sigma synthesizer, a frequency multiplier, or a synthesizer comprising a phase-locked loop with a frequency divider.

The synthesizer circuitry 1606D may be configured to synthesize an output frequency for use by the mixer circuitry 1606A of the RF circuitry 1606 based on a frequency input and a divider control input. In some embodiments, the synthesizer circuitry 1606D may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606D of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610. In various embodiments, the amplification through the transmit or receive signal paths may be done solely in the RF circuitry 1606, solely in the FEM 1608, or in both the RF circuitry 1606 and the FEM 1608.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610).

In some embodiments, the PMC 1612 may manage power provided to the baseband circuitry 1604. In particular, the PMC 1612 may control power-source selection, voltage scaling, battery charging, or DC-to-DC conversion. The PMC 1612 may often be included when the device 1600 is capable of being powered by a battery, for example, when the device is included in a UE. The PMC 1612 may increase the power conversion efficiency while providing desirable implementation size and heat dissipation characteristics.

While FIG. 16 shows the PMC 1612 coupled only with the baseband circuitry 1604. However, in other embodiments, the PMC 1612 may be additionally or alternatively coupled with, and perform similar power management operations for, other components such as, but not limited to, application circuitry 1602, RF circuitry 1606, or FEM 1608.

In some embodiments, the PMC 1612 may control, or otherwise be part of, various power saving mechanisms of the device 1600. For example, if the device 1600 is in an RRC_Connected state, where it is still connected to the RAN node as it expects to receive traffic shortly, then it may enter a state known as Discontinuous Reception Mode (DRX) after a period of inactivity. During this state, the device 1600 may power down for brief intervals of time and thus save power.

If there is no data traffic activity for an extended period of time, then the device 1600 may transition off to an RRC Idle state, where it disconnects from the network and does not perform operations such as channel quality feedback, handover, and so on. The device 1600 goes into a very low power state and it performs paging where again it periodically wakes up to listen to the network and then powers down again. The device 1600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1602 and processors of the baseband circuitry 1604 may be used to execute elements of one or more instances of a protocol stack. For example, processors of the baseband circuitry 1604, alone or in combination, may be used execute Layer 3, Layer 2, or Layer 1 functionality, while processors of the application circuitry 1604 may utilize data (e.g., packet data) received from these layers and further execute Layer 4 functionality (e.g., transmission communication protocol (TCP) and user datagram protocol (UDP) layers). As referred to herein, Layer 3 may comprise an RRC layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 17:
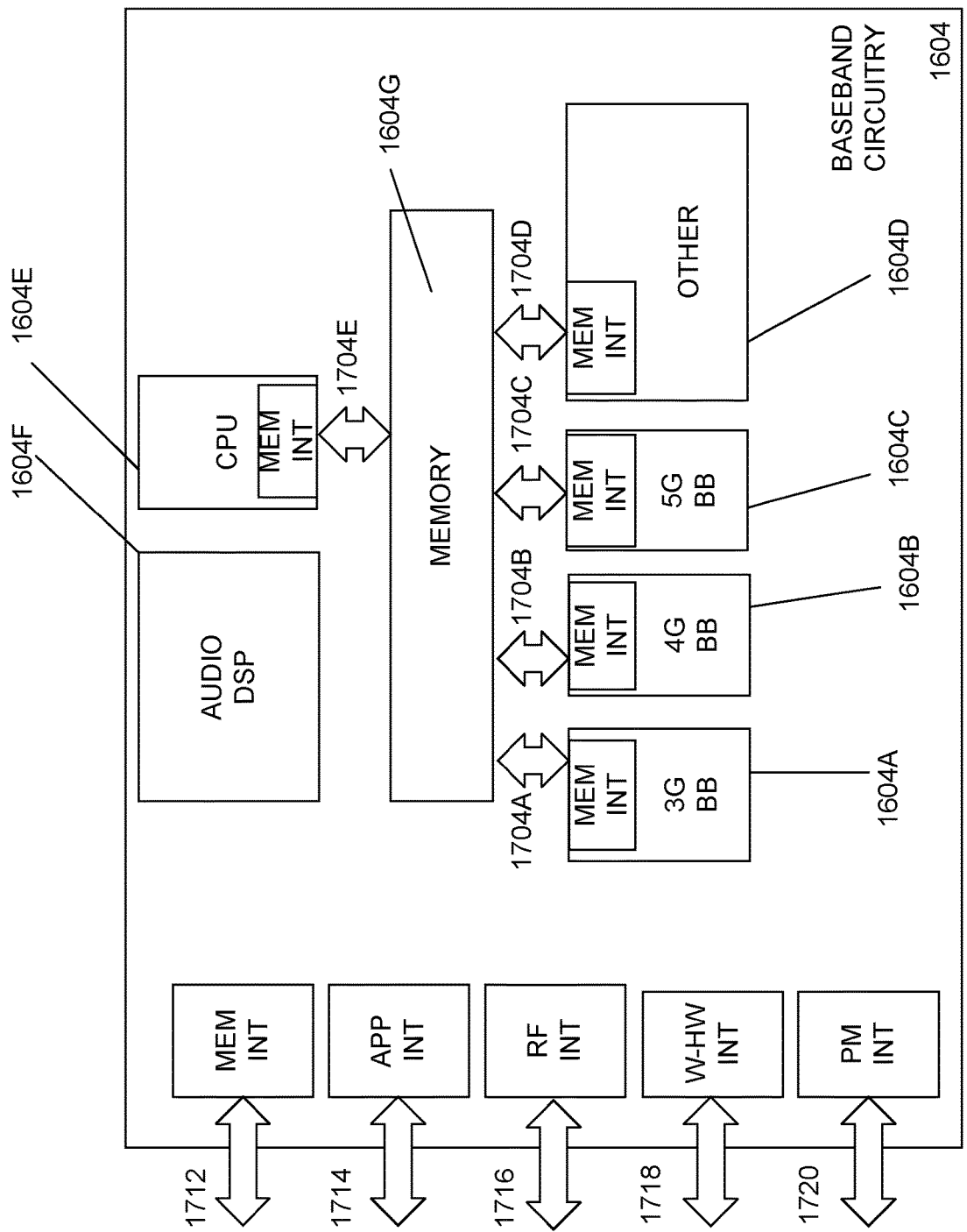
FIG. 17 illustrates example interfaces of baseband circuitry, in accordance with some embodiments of the disclosure.

FIG. 17 illustrates example interfaces of baseband circuitry, in accordance with some embodiments of the disclosure. As discussed above, the baseband circuitry 1604 of FIG. 16 may comprise processors 1604A-1604E and a memory 1604G utilized by said processors. Each of the processors 1604A-1604E may include a memory interface, 1704A-1704E, respectively, to send/receive data to/from the memory 1604G.

The baseband circuitry 1604 may further include one or more interfaces to communicatively couple to other circuitries/devices, such as a memory interface 1712 (e.g., an interface to send/receive data to/from memory external to the baseband circuitry 1604), an application circuitry interface 1714 (e.g., an interface to send/receive data to/from the application circuitry 1602 of FIG. 16), an RF circuitry interface 1716 (e.g., an interface to send/receive data to/from RF circuitry 1606 of FIG. 16), a wireless hardware connectivity interface 1718 (e.g., an interface to send/receive data to/from Near Field Communication (NFC) components, Bluetooth® components (e.g., Bluetooth® Low Energy), Wi-Fi® components, and other communication components), and a power management interface 1720 (e.g., an interface to send/receive power or control signals to/from the PMC 1612.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with a fifth-generation (5G) Evolved Node B (gNB) on a wireless network, comprising: one or more processors to: process a Physical Downlink Control Channel (PDCCH) within a bandwidth at a start of a slot; allocate a Guard Period (GP) within the bandwidth and subsequent to the PDCCH; generate a Physical Uplink Control Channel (PUCCH) within the bandwidth and in one or more Orthogonal Frequency-Division Multiplexing (OFDM) symbols at the end of the slot; and generate a Physical Uplink Shared Channel (PUSCH) within the bandwidth and in one or more OFDM symbols extending between the GP and the PUCCH, the PUSCH being time-division multiplexed with the PUCCH, and an interface for receiving the PDCCH from a receiving circuitry and for sending the PUCCH and the PUSCH to a transmission circuitry.

In example 2, the apparatus of example 1, wherein the PUCCH and at least part of the PUSCH are within the same OFDM symbols and are within different frequency resources.

In example 3, the apparatus of any of examples 1 through 2, wherein the PUCCH comprises a first part carrying Hybrid Automatic Repeat Request (HARQ) Acknowledgement (ACK) feedback and a second part containing other Uplink Control Information (UCI) information.

In example 4, the apparatus of any of examples 1 through 3, wherein the PUCCH comprises a first part carrying a first type of Uplink Control Information (UCI) and a second part carrying a second type of UCI; and wherein the first part and the second part are within different frequency resources.

In example 5, the apparatus of any of examples 1 through 4, wherein the PUCCH comprises a first part carrying Demodulation Reference Signal (DM-RS) and a second part carrying Hybrid Automatic Repeat Request (HARQ) Acknowledgement (ACK) feedback; and wherein the second part is carried on one or more Resource Elements (REs) adjacent in frequency to the first part.

In example 6, the apparatus of any of examples 1 through 5, wherein the PUCCH comprises Hybrid Automatic Repeat Request (HARQ) Acknowledgement (ACK) feedback distributed among the frequency resources of the PUCCH.

In example 7, the apparatus of any of examples 1 through 6, wherein the PUCCH spans two OFDM symbols; wherein a Channel State Information (CSI) report is carried in a second-to-last OFDM symbol of the two OFDM symbols; and wherein Hybrid Automatic Repeat Request (HARQ) Acknowledgement (ACK) feedback is carried in a last OFDM symbol of the two OFDM symbols.

In example 8, the apparatus of any of examples 1 through 7, wherein Hybrid Automatic Repeat Request (HARQ) Acknowledgement (ACK) feedback is carried in a first set of frequency resources; and wherein a Channel State Information (CSI) report is carried in two second sets of frequency resources surrounding the first set of frequency resources.

In example 9, the apparatus of any of examples 1 through 8, wherein the PUCCH comprises Hybrid Automatic Repeat Request (HARQ) Acknowledgement (ACK) feedback carried in a first set of frequency resources; and wherein the PUCCH comprises Demodulation Reference Signal (DM-RS) carried in a second set of frequency resources adjacent to the first set of frequency resources.

In example 10, the apparatus of any of examples 1 through 9, wherein the PUCCH spans two OFDM symbols; and wherein the PUCCH comprises Demodulation Reference Signal (DM-RS) carried in the first OFDM symbol.

In example 11, the apparatus of any of examples 1 through 10, wherein the one or more processors are to: generate an additional PUSCH in frequency resources adjacent to the PUCCH.

In example 12, the apparatus of example 11, wherein an Uplink Control Information (UCI) of the PUCCH is carried in two sets of frequency resources adjacent to two respectively corresponding edges of the set of frequency resources carrying the additional PUSCH.

In example 13, the apparatus of example 11, wherein an Uplink Control Information (UCI) of the PUCCH is carried in a set of frequency resources interleaved with a set of frequency resources carrying the additional PUSCH.

Example 14 provides a User Equipment (UE) device comprising an application processor, a memory, one or more antennas, a wireless interface for allowing the application processor to communicate with another device, and a touch-screen display, the UE device including the apparatus of any of examples 1 through 13.

Example 15 provides machine readable storage media having machine executable instructions that, when executed, cause one or more processors of a User Equipment (UE) operable to communicate with a fifth-generation (5G) Evolved Node B (gNB) on a wireless network to perform an operation comprising: process a Physical Downlink Control Channel (PDCCH) within a bandwidth at a start of a slot; allocate a Guard Period (GP) within the bandwidth and subsequent to the PDCCH; generate a Physical Uplink Control Channel (PUCCH) within the bandwidth and in one or more Orthogonal Frequency-Division Multiplexing (OFDM) symbols at the end of the slot; and generate a Physical Uplink Shared Channel (PUSCH) within the bandwidth and in one or more OFDM symbols extending between the GP and the PUCCH, the PUSCH being time-division multiplexed with the PUCCH.

In example 16, the machine readable storage media of example 15, wherein the PUCCH and at least part of the PUSCH are within the same OFDM symbols and are within different frequency resources.

In example 17, the machine readable storage media of any of examples 15 through 16, wherein the PUCCH comprises a first part carrying Hybrid Automatic Repeat Request (HARQ) Acknowledgement (ACK) feedback and a second part containing other Uplink Control Information (UCI) information.

In example 18, the machine readable storage media of any of examples 15 through 17, wherein the PUCCH comprises a first part carrying a first type of Uplink Control Information (UCI) and a second part carrying a second type of UCI; and wherein the first part and the second part are within different frequency resources.

In example 19, the machine readable storage media of any of examples 15 through 18, wherein the PUCCH comprises a first part carrying Demodulation Reference Signal (DM-RS) and a second part carrying Hybrid Automatic Repeat Request (HARQ) Acknowledgement (ACK) feedback; and wherein the second part is carried on one or more Resource Elements (REs) adjacent in frequency to the first part.

In example 20, the machine readable storage media of any of examples 15 through 19, wherein the PUCCH comprises Hybrid Automatic Repeat Request (HARQ) Acknowledgement (ACK) feedback distributed among the frequency resources of the PUCCH.

In example 21, the machine readable storage media of any of examples 15 through 20, wherein the PUCCH spans two OFDM symbols; wherein a Channel State Information (CSI) report is carried in a second-to-last OFDM symbol of the two OFDM symbols; and wherein Hybrid Automatic Repeat Request (HARQ) Acknowledgement (ACK) feedback is carried in a last OFDM symbol of the two OFDM symbols.

In example 22, the machine readable storage media of any of examples 15 through 21, wherein Hybrid Automatic Repeat Request (HARQ) Acknowledgement (ACK) feedback is carried in a first set of frequency resources; and wherein a Channel State Information (CSI) report is carried in two second sets of frequency resources surrounding the first set of frequency resources.

In example 23, the machine readable storage media of any of examples 15 through 22, wherein the PUCCH comprises Hybrid Automatic Repeat Request (HARQ) Acknowledgement (ACK) feedback carried in a first set of frequency resources; and wherein the PUCCH comprises Demodulation Reference Signal (DM-RS) carried in a second set of frequency resources adjacent to the first set of frequency resources.

In example 24, the machine readable storage media of any of examples 15 through 23, wherein the PUCCH spans two OFDM symbols; and wherein the PUCCH comprises Demodulation Reference Signal (DM-RS) carried in the first OFDM symbol.

In example 25, the machine readable storage media of any of examples 15 through 24, the operation comprising: generate an additional PUSCH in frequency resources adjacent to the PUCCH.

In example 26, the machine readable storage media of example 25, wherein an Uplink Control Information (UCI) of the PUCCH is carried in two sets of frequency resources adjacent to two respectively corresponding edges of the set of frequency resources carrying the additional PUSCH.

In example 27, the machine readable storage media of example 25, wherein an Uplink Control Information (UCI) of the PUCCH is carried in a set of frequency resources interleaved with a set of frequency resources carrying the additional PUSCH.

Example 28 provides an apparatus of a User Equipment (UE) operable to communicate with a fifth-generation (5G) Evolved Node B (gNB) on a wireless network, comprising: one or more processors to: process a Physical Downlink Control Channel (PDCCH) within a bandwidth at a start of a slot; allocate a Guard Period (GP) within the bandwidth and subsequent to the PDCCH; generate a Physical Uplink Control Channel (PUCCH) in one or more subcarrier frequencies within the bandwidth and extending between the GP and an end of the slot; and generate a Physical Uplink Shared Channel (PUSCH) in one or more subcarrier frequencies within the bandwidth and extending between the GP and the end of the slot, the PUSCH being frequency-division multiplexed with the PUCCH, and an interface for receiving the PDCCH from a receiving circuitry and for sending the PUCCH and the PUSCH to a transmission circuitry.

In example 29, the apparatus of example 28, wherein the PUSCH is carried in a set of frequency resources adjacent to a set of frequency resources carrying the PUSCH.

In example 30, the apparatus of any of examples 28 through 29, wherein a Downlink Control Information (DCI) of the PDCCH carries a PUCCH resource allocation field to indicate a PUCCH resource value selected from a set of predetermined PUCCH resource values.

In example 31, the apparatus of any of examples 28 through 30, wherein the one or more processors are to: process a transmission carrying an indicator of a transmission mode, wherein the transmission mode is selected from one of: transmitting PUCCH on a pre-configured resource, or transmitting PUCCH adjacent to PUSCH.

In example 32, the apparatus of example 31, wherein the transmission carrying the indicator of the transmission mode is one of: a UE-specific Radio Resource Control (RRC) transmission, a Minimum System Information (MSI) transmission, a Remaining Minimum System Information (RMSI) transmission, or an Other System Information (OSI) transmission.

Example 33 provides a User Equipment (UE) device comprising an application processor, a memory, one or more antennas, a wireless interface for allowing the application processor to communicate with another device, and a touch-screen display, the UE device including the apparatus of any of examples 28 through 32.

Example 34 provides readable storage media having machine executable instructions that, when executed, cause one or more processors of a User Equipment (UE) operable to communicate with a fifth-generation (5G) Evolved Node B (gNB) on a wireless network to perform an operation comprising: process a Physical Downlink Control Channel (PDCCH) within a bandwidth at a start of a slot; allocate a Guard Period (GP) within the bandwidth and subsequent to the PDCCH; generate a Physical Uplink Control Channel (PUCCH) in one or more subcarrier frequencies within the bandwidth and extending between the GP and an end of the slot; and generate a Physical Uplink Shared Channel (PUSCH) in one or more subcarrier frequencies within the bandwidth and extending between the GP and the end of the slot, the PUSCH being frequency-division multiplexed with the PUCCH.

In example 35, the machine readable storage media of example 34, wherein the PUSCH is carried in a set of frequency resources adjacent to a set of frequency resources carrying the PUSCH.

In example 36, the machine readable storage media of any of examples 34 through 35, wherein a Downlink Control Information (DCI) of the PDCCH carries a PUCCH resource allocation field to indicate a PUCCH resource value selected from a set of predetermined PUCCH resource values.

In example 37, the machine readable storage media of any of examples 34 through 36, the operation comprising: process a transmission carrying an indicator of a transmission mode, wherein the transmission mode is selected from one of: transmitting PUCCH on a pre-configured resource, or transmitting PUCCH adjacent to PUSCH.

In example 38, the machine readable storage media of example 37, wherein the transmission carrying the indicator of the transmission mode is one of: a UE-specific Radio Resource Control (RRC) transmission, a Minimum System Information (MSI) transmission, a Remaining Minimum System Information (RMSI) transmission, or an Other System Information (OSI) transmission.

In example 39, the apparatus of any of examples 1 through 13, and 28 through 32, wherein the one or more processors comprise a baseband processor.

In example 40, the apparatus of any of examples 1 through 13, and 28 through 32, comprising a memory for storing instructions, the memory being coupled to the one or more processors.

In example 41, the apparatus of any of examples 1 through 13, and 28 through 32, comprising a transceiver circuitry for at least one of: generating transmissions, encoding transmissions, processing transmissions, or decoding transmissions.

In example 42, the apparatus of any of examples 1 through 13, and 28 through 32, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station on a wireless network, comprising:
    one or more processors to:
        process a Physical Downlink Control Channel (PDCCH) within a bandwidth at a start of a slot;
        allocate a Guard Period (GP) within the bandwidth and subsequent and adjacent to the PDCCH;
        generate a Physical Uplink Control Channel (PUCCH) within the bandwidth and in one or more Orthogonal Frequency-Division Multiplexing (OFDM) symbols including an end OFDM symbol at an end of the slot; and
        generate a Physical Uplink Shared Channel (PUSCH) within the bandwidth and in a number of OFDM symbols occupying all OFDM symbols between the GP and the PUCCH at the end of the slot, the PUSCH including the end OFDM symbol at the end of the slot and being time-division multiplexed with the PUCCH and separating the GP from the PUCCH, wherein the GP is adjacent to the PUSCH; and
    an interface for receiving the PDCCH from a receiving circuitry and for sending the PUCCH and the PUSCH to a transmission circuitry.

2. The UE of claim 1, wherein the PUCCH and at least part of the PUSCH are within the same OFDM symbols and are within different frequency resources.

3. The UE of claim 1, wherein the PUCCH comprises a first part carrying Hybrid Automatic Repeat Request (HARQ) Acknowledgement (ACK) feedback and a second part containing other Uplink Control Information (UCI) information.

4. The UE of claim 1, wherein the PUCCH comprises a first part carrying a first type of Uplink Control Information (UCI) and a second part carrying a second type of UCI; and
    wherein the first part and the second part are within different frequency resources.

5. The UE s of claim 1, wherein the PUCCH comprises a first part carrying Demodulation Reference Signal (DM-RS) and a second part carrying Hybrid Automatic Repeat Request (HARQ) Acknowledgement (ACK) feedback; and
    wherein the second part is carried on one or more Resource Elements (REs) adjacent in frequency to the first part.

6. The UE of claim 1, wherein the PUCCH comprises Hybrid Automatic Repeat Request (HARQ) Acknowledgement (ACK) feedback distributed among frequency resources of the PUCCH.

7. The UE of claim 1, wherein the PUCCH spans two OFDM symbols;
    wherein a Channel State Information (CSI) report is carried in a second-to-last OFDM symbol of the two OFDM symbols; and
    wherein Hybrid Automatic Repeat Request (HARQ) Acknowledgement (ACK) feedback is carried in a last OFDM symbol of the two OFDM symbols.

8. A method comprising:
    processing a Physical Downlink Control Channel (PDCCH) within a bandwidth at a start of a slot;
    allocating a Guard Period (GP) within the bandwidth and subsequent and adjacent to the PDCCH;
    generating a Physical Uplink Control Channel (PUCCH) within the bandwidth and in one or more Orthogonal Frequency-Division Multiplexing (OFDM) symbols including an end OFDM symbol at an end of the slot; and
    generating a Physical Uplink Shared Channel (PUSCH) within the bandwidth and in a number of OFDM symbols occupying all OFDM symbols between the GP and the PUCCH at the end of the slot, the PUSCH including the end OFDM symbol at the end of the slot and being time-division multiplexed with the PUCCH and separating the GP from the PUCCH, wherein the GP is adjacent to the PUSCH.

9. The method of claim 8, wherein the PUCCH and at least part of the PUSCH are within the same OFDM symbols and are within different frequency resources.

10. The method of claim 8, wherein the PUCCH comprises a first part carrying Hybrid Automatic Repeat Request (HARQ) Acknowledgement (ACK) feedback and a second part containing other Uplink Control Information (UCI) information.

11. The method of claim 8, wherein the PUCCH comprises a first part carrying a first type of Uplink Control Information (UCI) and a second part carrying a second type of UCI; and wherein the first part and the second part are within different frequency resources.

12. The method of claim 8, wherein the PUCCH comprises a first part carrying Demodulation Reference Signal (DM-RS) and a second part carrying Hybrid Automatic Repeat Request (HARQ) Acknowledgement (ACK) feedback; and wherein the second part is carried on one or more Resource Elements (REs) adjacent in frequency to the first part.

13. The method of claim 8, wherein the PUCCH comprises Hybrid Automatic Repeat Request (HARQ) Acknowledgement (ACK) feedback distributed among frequency resources of the PUCCH.

14. The method of claim 8, wherein the PUCCH spans two OFDM symbols;

wherein a Channel State Information (CSI) report is carried in a second-to-last OFDM symbol of the two OFDM symbols; and wherein Hybrid Automatic Repeat Request (HARQ) Acknowledgement (ACK) feedback is carried in a last OFDM symbol of the two OFDM symbols.

15. A User Equipment (UE) operable to communicate with a base station on a wireless network, comprising:

one or more processors to:

process a Physical Downlink Control Channel (PDCCH) within a bandwidth at a start of a slot;

allocate a Guard Period (GP) within the bandwidth and subsequent and adjacent to the PDCCH;

generate a Physical Uplink Control Channel (PUCCH) in one or more subcarrier frequencies within the bandwidth and extending between the GP and an end of the slot and including an end OFDM symbol at the end of the slot; and generate a Physical Uplink Shared Channel (PUSCH) in one or more subcarrier frequencies within the bandwidth in a number of OFDM symbols occupying all OFDM symbols between the GP and the PUCCH at the end of the slot, the PUSCH including the end OFDM symbol at the end of the slot and being frequency-division multiplexed with the PUCCH and separating the GP from the PUCCH, wherein the GP is adjacent to the PUSCH; and an interface for receiving the PDCCH from a receiving circuitry and for sending the PUCCH and the PUSCH to a transmission circuitry.

16. The UE of claim 15, wherein the PUSCH is carried in a set of frequency resources adjacent to a set of frequency resources carrying the PUCCH.

17. The UE of claim 15, wherein a Downlink Control Information (DCI) of the PDCCH carries a PUCCH resource allocation field to indicate a PUCCH resource value selected from a set of predetermined PUCCH resource values.

18. The UE of claim 15, wherein the one or more processors are to:

process a transmission carrying an indicator of a transmission mode, wherein the transmission mode is selected from one of: transmitting PUCCH on a preconfigured resource, or transmitting PUCCH adjacent to PUSCH.

19. The UE of claim 18, wherein the transmission carrying the indicator of the transmission mode is one of: a UE-specific Radio Resource Control (RRC) transmission, a Minimum System Information (MSI) transmission, a Remaining Minimum System Information (RMSI) transmission, or an Other System Information (OSI) transmission.

20. A method comprising:

processing a Physical Downlink Control Channel (PDCCH) within a bandwidth at a start of a slot;

allocating a Guard Period (GP) within the bandwidth and subsequent and adjacent to the PDCCH;

generating a Physical Uplink Control Channel (PUCCH) in one or more subcarrier frequencies within the bandwidth and extending between the GP and an end of the slot and including an end OFDM symbol at the end of the slot; and generating a Physical Uplink Shared Channel (PUSCH) in one or more subcarrier frequencies within the bandwidth in a number of OFDM symbols occupying all OFDM symbols between the GP and the PUCCH at the end of the slot, the PUSCH including the end OFDM symbol at the end of the slot and being frequency-division multiplexed with the PUCCH and separating the GP from the PUCCH, wherein the GP is adjacent to the PUSCH.

21. The method of claim 20, wherein the PUSCH is carried in a set of frequency resources adjacent to a set of frequency resources carrying the PUCCH.

22. The method of claim 20, wherein a Downlink Control Information (DCI) of the PDCCH carries a PUCCH resource allocation field to indicate a PUCCH resource value selected from a set of predetermined PUCCH resource values.

23. The method of claim 20, comprising:

processing a transmission carrying an indicator of a transmission mode, wherein the transmission mode is selected from one of: transmitting PUCCH on a preconfigured resource, or transmitting PUCCH adjacent to PUSCH.

24. The method of claim 23, wherein the transmission carrying the indicator of the transmission mode is one of: a UE-specific Radio Resource Control (RRC) transmission, a Minimum System Information (MSI) transmission, a Remaining Minimum System Information (RMSI) transmission, or an Other System Information (OSI) transmission.

* * * * *